(12) United States Patent
Ikuta

(10) Patent No.: US 10,186,294 B2
(45) Date of Patent: Jan. 22, 2019

(54) RECORDING DEVICE, RECORDING METHOD, OPTICAL RECORDING MEDIUM, REPRODUCING DEVICE, AND REPRODUCING METHOD

(71) Applicant: SONY CORPORATION, Tokyo (JP)

(72) Inventor: Kazuki Ikuta, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/574,433

(22) PCT Filed: Mar. 23, 2016

(86) PCT No.: PCT/JP2016/059161
§ 371 (c)(1),
(2) Date: Nov. 15, 2017

(87) PCT Pub. No.: WO2016/189943
PCT Pub. Date: Dec. 1, 2016

(65) Prior Publication Data
US 2018/0137888 A1    May 17, 2018

(30) Foreign Application Priority Data
May 26, 2015 (JP) .................... 2015-106576

(51) Int. Cl.
*G11B 7/00* (2006.01)
*G11B 7/1267* (2012.01)
(Continued)

(52) U.S. Cl.
CPC ............ *G11B 7/1267* (2013.01); *G11B 7/007* (2013.01); *G11B 7/0045* (2013.01); *G11B 7/0079* (2013.01); *G11B 7/1263* (2013.01)

(58) Field of Classification Search
None
See application file for complete search history.

(56) References Cited

U.S. PATENT DOCUMENTS

2003/0185121 A1* 10/2003 Narumi .............. G11B 7/00736
369/47.53
2003/0200384 A1* 10/2003 Edanami ............... G06F 3/0601
711/112
(Continued)

FOREIGN PATENT DOCUMENTS

CN    102077281 A    5/2011
CN    102110447 A    6/2011
(Continued)

OTHER PUBLICATIONS

International Search Report and Written Opinion of PCT Application No. PCT/JP2016/059161, dated Jun. 14, 2016, 09 pages of ISRWO.

*Primary Examiner* — Peter Vincent Agustin
(74) *Attorney, Agent, or Firm* — Chip Law Group

(57) ABSTRACT

Provided is a technique that reduces the possibility that data will not be recorded due to a shortage of test areas. A test area, in which test writing for laser power control is performed, is set in each recording layer of an optical recording medium having a plurality of recording layers, and information indicating a position of the set test area is recorded on the optical recording medium. Furthermore, recorded information of an optical recording medium is reproduced, the optical recording medium including a plurality of recording layers and in which a test area, in which test writing for laser power control is performed, is set in each of the recording layers and information indicating a position of the set test area is recorded; and the information indicating the position of the test area is acquired.

10 Claims, 13 Drawing Sheets

(51) Int. Cl.
*G11B 7/0045* (2006.01)
*G11B 7/007* (2006.01)
*G11B 7/1263* (2012.01)

(56) References Cited

U.S. PATENT DOCUMENTS

| | | | |
|---|---|---|---|
| 2004/0033054 A1* | 2/2004 | Haino | G11B 20/1217 386/240 |
| 2005/0025013 A1* | 2/2005 | Yamamoto | G11B 7/00736 369/47.53 |
| 2005/0041555 A1* | 2/2005 | Ogawa | G11B 7/00736 369/94 |
| 2005/0052975 A1 | 3/2005 | Banno | |
| 2005/0226133 A1* | 10/2005 | Ueki | G11B 7/00736 369/275.3 |
| 2007/0025210 A1* | 2/2007 | Kishigami | G11B 7/00736 369/47.53 |
| 2007/0070846 A1* | 3/2007 | Tokiwa | G11B 7/00736 369/47.53 |
| 2009/0303854 A1* | 12/2009 | Nakatani | B82Y 10/00 369/94 |
| 2010/0103793 A1* | 4/2010 | Nakamura | G11B 7/00736 369/94 |
| 2011/0096643 A1 | 4/2011 | Nakamura et al. | |
| 2011/0158069 A1 | 6/2011 | Mutsuro et al. | |
| 2013/0279316 A1 | 10/2013 | Iriyama | |

FOREIGN PATENT DOCUMENTS

| | | |
|---|---|---|
| CN | 103377663 A | 10/2013 |
| EP | 2341500 A1 | 7/2011 |
| JP | 2004-295940 A | 10/2004 |
| JP | 2005-071470 A | 3/2005 |
| JP | 2005-302086 A | 10/2005 |
| JP | 2011-138575 A | 7/2011 |
| JP | 2013-218782 A | 10/2013 |
| JP | 2013-225360 A | 10/2013 |
| JP | 2014-071922 A | 4/2014 |
| KR | 10-2011-0074956 A | 7/2011 |
| MX | 2010013194 A | 12/2010 |
| RU | 2010154076 A | 12/2012 |
| TW | 201025308 A | 7/2010 |
| WO | 2005/034110 A1 | 4/2005 |
| WO | 2010/050143 A1 | 5/2010 |

* cited by examiner

RECORDING DEVICE, RECORDING METHOD, OPTICAL RECORDING MEDIUM, REPRODUCING DEVICE, AND REPRODUCING METHOD

CROSS REFERENCE TO RELATED APPLICATIONS

This application is a U.S. National Phase of International Patent Application No. PCT/JP2016/059161 filed on Mar. 23, 2016, which claims priority benefit of Japanese Patent Application No. JP 2015-106576 filed in the Japan Patent Office on May 26, 2015. Each of the above-referenced applications is hereby incorporated herein by reference in its entirety.

TECHNICAL FIELD

The present technology relates to a recording device and a recording method that record data on a recordable optical recording medium, such as a write-once optical recording medium or a rewritable optical recording medium, the optical recording medium, and a reproducing device and a reproducing method that reproduce data from the optical recording medium.

CITATION LIST

Patent Document

Patent Document 1: International Publication No. 05/034110 Pamphlet
Patent Document 2: Japanese Patent Application Laid-Open No. 2004-295940

BACKGROUND ART

For example, a disk-shaped optical recording medium (hereinafter, also referred to as an "optical disc"), such as a Blu-ray disc (registered trademark), has been known. Information is recorded on or reproduced from the optical recording medium, using laser light emitted from a semiconductor laser.

The recording of information on an optical disc by laser light is greatly affected by a variation in laser power due to temperature or a change over time, various skews or offsets caused by an adjustment error during manufacture, and a variation in recording conditions in drive control. Therefore, in particular, in a recordable optical disc, such as a write-once disc or a rewritable disc, a variation in a laser driving circuit or an optical element is prevented and accurate emission wavelength control is performed.

In general, before data recording is performed, a recording device searches for optimum laser power using a test area (optimum power control area (OPC area)) provided in each recording layer and adjusts recording laser power or strategy to optimize recording conditions.

In a test writing process (test write) for adjusting recording laser power, it is necessary to remove, for example, perturbation, to optimize the recording laser power, and to optimize a laser drive pulse in a state in which the optimum recording conditions are unclear. In some cases, laser light with energy more than is needed is emitted or laser light is emitted in a state in which the width of a laser drive pulse (laser emission time) is not appropriate in order to search for the optimum conditions such as recording laser power. As a result, the OPC area in the recording layer is likely to be severely damaged.

In addition, in a so-called multi-layer optical disc in which a plurality of recording layers are formed on a disc substrate, the recording or reproduction of data on or from a recording layer is affected by the recording state of another recording layer which is provided on the front side (which is closer to a laser light incident surface than the recording layer).

For example, the transmittance of the recording layer is changed by recording, which makes it difficult to irradiate the current recording layer with an appropriate amount of laser light. In addition, since a change in transmittance depends on recording power, it is difficult to control the change in transmittance, that is, the degree of influence on a rear-side recording layer in a portion in which recording is performed while recording power is changed, such as an OPC area.

From these points of view, there is a problem that it is difficult to achieve desired OPC according to the recording state of a front-side recording layer and to accurately derive optimization conditions. That is, in a case where laser power adjustment associated with test writing is performed in an OPC area of a recording layer, recording or reproduction is affected by OPC areas of other recording layers which are arranged at the same position (that is, the positions that overlap each other in a thickness direction (=a layer direction)) in a planar direction (a radial direction of the disc).

In contrast, in the related art, for example, a method is proposed in which OPC areas of different recording layers are shifted in the radial direction of the recording layer, as disclosed in Patent Document 1.

In the existing two-layer standard of the Blu-ray disc, the OPC areas of each recording layer arranged in a read-in zone which is provided on the inner circumferential side of the disc are arranged so as to be shifted in the radial direction of the recording layer.

SUMMARY OF THE INVENTION

Problems to be Solved to be Solved by the Invention

As described above, in the multi-layer optical disc, the OPC areas (test areas) are arranged in each recording layer at positions that do not overlap each other in the layer direction, considering the influence of a change in the transmittance of the front-side recording layer.

However, in the related art, the arrangement of the test areas is fixed in the same optical disc. As such, when the arrangement of the test areas is fixed, it is difficult to appropriately respond to, for example, a case where the amount of test area used in each recording layer varies depending on systems.

For example, an optical disc to which a first file system in which the amount of test area used in the rearmost layer (referred to as an "L0 layer") tends to be more than that in other layers and a second file system in which the amounts of test areas used in each layer tend to be substantially equal to each other can be applied as a file system is assumed. In a case where the numbers of test areas arranged in each layer are substantially equal to each other in order to respond to the second file system, the number of test areas arranged in the L0 layer tends to be less than that in a case where the first file system is applied. In contrast, in a case where a larger number of test areas are arranged in the L0 layer in order to respond to the first file system, the number of test areas arranged in the L0 layer is greater than that in a case where the second file system is applied and the number of test areas arranged in other layers tends to be relatively insufficient.

When the number of test areas tends to be insufficient, it is impossible to perform OPC even when a user data recording area is empty, which may cause the optical recording medium to be in an unrecordable state. This means that it is difficult to record the amount of user data prescribed in the optical recording medium and is disadvantageous to the user.

Accordingly, the present technology has been made in order to solve the above-mentioned problems and an object of the present technology is to reduce the possibility that data will not be recorded due to a shortage of test areas.

Solutions to Problems

A recording device according to the present technology includes: a recording unit that irradiates a recording layer of an optical recording medium having a plurality of recording layers with laser light to record information; and a control unit that sets a test area, in which test writing for laser power control is performed, in each of the recording layers and directs the recording unit to record information indicating a position of the set test area on the optical recording medium.

With this structure, it is possible to arrange an arbitrary number of test areas at any positions while guaranteeing that other devices (devices other than the device that has set the test area) can recognize the position of the test area. That is, for an optical recording medium in which the amounts of test areas used in each recording layer are likely to be different from each other, it is possible to adaptively set the test area in each case.

In the recording device according to the present technology, it is preferable that the control unit sets the test area according to a type of file system applied to the optical recording medium.

With this structure, it is possible to adaptively set the test area according to the file system in correspondence with a case where the amount of test area used in each recording layer varies depending on the type of file system.

In the recording device according to the present technology, it is preferable that the control unit determines whether to use a use candidate area, which is a test area candidate proposed to be used, among the set test areas, on the basis of the usage of a rear-side test area which is closer to a surface opposite to a laser incident surface in a layer direction of the optical recording medium than the use candidate area and overlaps the use candidate area.

With this structure, it is possible to use the front-side test area after checking that the rear-side test area has been used.

In the recording device according to the present technology, it is preferable that the control unit determines whether to use a use candidate area, which is a test area candidate proposed to be used, among the set test areas, on the basis of the usage of a front-side test area which is closer to a laser incident surface in a layer direction of the optical recording medium than the use candidate area and overlaps the use candidate area.

With this structure, it is possible to use the rear-side test area after checking that there is no change in transmittance in the front-side test area.

In the recording device according to the present technology, it is preferable that the control unit sets the test area in an inner zone that is closer to an inner circumferential side than a data zone in which user data is recorded and the data zone.

With this structure, the number of test areas can be greater than that in a case where the test area is set only in the inner zone. Furthermore, it is possible to respond to a case where it is preferable to separately adjust laser power in the inner zone and the data zone, for example, a case where recording is performed in the data zone at a higher speed and a higher density than that in the inner zone.

In the recording device according to the present technology, it is preferable that the control unit sets a new test area other than the test area, of which the positional information has been recorded on the optical recording medium, in the data zone and directs the recording unit to record information indicating the position of the set test area on the optical recording medium.

With this structure, it is possible to add a test area to the area in which user data is recorded, if necessary.

In the recording device according to the present technology, it is preferable that, in a case where the test area is set in the data zone, the control unit sets the test area in an area which corresponds to an unrecorded area of a front-side recording layer that is closer to the laser incident surface than the recording layer in which the test area is to be set.

With this structure, it is possible to add a test area to an area behind the area in which there is no change in transmittance.

In the recording device according to the present technology, it is preferable that, in a case where the test area is set in the data zone, the control unit sets the test area in an area which corresponds to a recorded area of a rear-side recording layer that is closer to a surface opposite to the laser incident surface than the recording layer in which the test area is to be set.

As described above, in a case where laser power is adjusted in the set test area on condition that data has been recorded in the corresponding area of the rear-side recording layer, it is possible to prevent data from being not recorded in a state in which there is an unrecorded area in the rear-side recording layer.

Furthermore, an optical recording medium according to the present technology includes: a plurality of recording layers, in which a test area, in which test writing for laser power control is performed, is set in each of the recording layers, and information indicating a position of the set test area is recorded on the optical recording medium.

With this structure, it is possible to achieve an optical recording medium in which an arbitrary number of test areas can be arranged at any positions and it is guaranteed that the position of the test area can be recognized by other devices (devices other than the device that has set the test area).

Furthermore, a reproducing device according to the present technology includes: a reproducing unit that irradiates an optical recording medium which includes a plurality of recording layers and in which a test area, in which test writing for laser power control is performed, is set in each of the recording layers and information indicating a position of the set test area is recorded with laser light to reproduce recorded information; and a control unit that directs the reproducing unit to reproduce the recorded information of the optical recording medium and acquires the information indicating the position of the test area.

With this structure, it is possible to ensure compatibility with the test area.

Effects of the Invention

According to the present technology, it is possible to reduce the possibility that data will not be recorded due to a shortage of test areas.

MODE FOR CARRYING OUT THE INVENTION

Hereinafter, embodiments of the present technology will be described in the following order.
[1. Disc Structure]
[2. Configuration of Drive Device]
[3. Example of Setting of OPC Area and Example of Use of OPC Area]
[4. Procedure]
[5. Summary of Embodiments]
[6. Modification Example]
[7. The Present Technology]

1. Disc Structure

The outline of an optical recording medium 100 according to an embodiment of the present technology will be described. The optical recording medium 100 according to the embodiment is an optical disc having a disk-shaped appearance and can be implemented as a write-once disc or a rewritable disc.

An example of the physical parameters of the optical recording medium 100 will be described.

The optical recording medium according to this example has, as a disc size, a diameter of about 120 mm and a thickness of about 1.2 mm. That is, from these points of view, the optical recording medium has a similar outward appearance as, for example, an optical disc of a digital versatile disc (DVD) type or an optical disc of a Blu-ray disc (registered trademark) type.

Furthermore, a so-called blue laser is used as a laser for recording and reproduction and an optical system with a high NA (for example, NA=0.85) is used to achieve a narrow track pitch (for example, a track pitch=about 0.32 μm).

Figure 1:
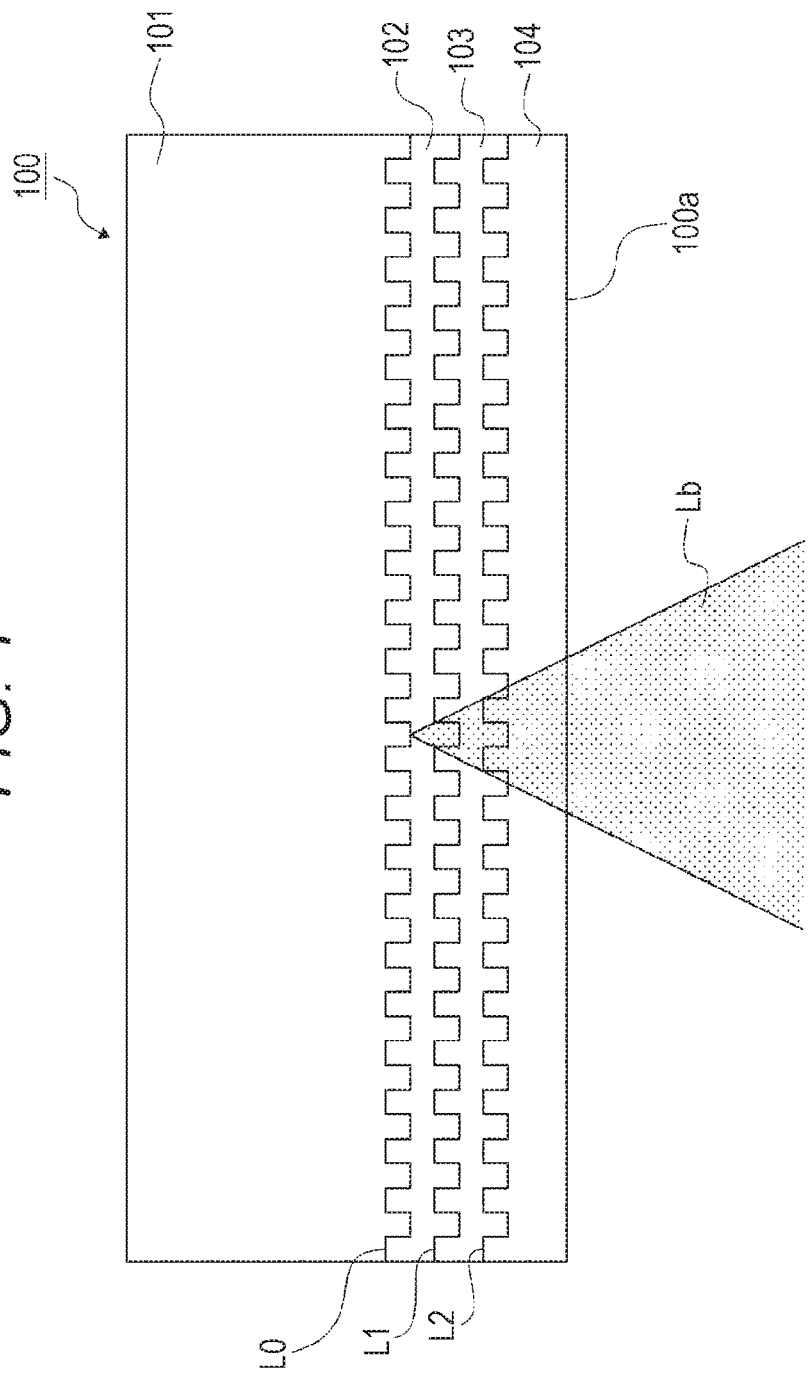
FIG. 1 is a diagram schematically illustrating the cross-sectional structure of an optical recording medium according to an embodiment.

FIG. 1 schematically illustrates the cross-sectional structure of the optical recording medium 100 according to this example.

The optical recording medium 100 according to this example includes a total of three layers, that is, a recording layer L0, a recording layer L1, and a recording layer L2 as recording layers L to which laser light is emitted to perform recording.

In the optical recording medium 100, the recording layer L0 is formed on a substrate 101. The substrate 101 is formed by, for example, the injection molding of a polycarbonate resin. A stamper is set in an injection molding die to transfer a groove shape to the substrate 101. The recording layer L0 has an uneven shape corresponding to the grooves.

Similarly, the recording layer L1 having grooves formed therein is formed above the recording layer L0, with an intermediate layer 102 interposed therebetween. In addition, the recording layer L2 having grooves formed therein is formed above the recording layer L1, with an intermediate layer 103 interposed therebetween similarly. Then, a light transmissive layer 104 is formed on the recording layer L2. The light transmissive layer 104 is formed by, for example, applying an ultraviolet-curable resin, using a spin coating method, and irradiating the ultraviolet-curable resin with ultraviolet rays to harden the ultraviolet-curable resin. Alternatively, the light transmissive layer 104 may be formed by a combination of an ultraviolet-curable resin and a polycarbonate sheet or a combination of an adhesive layer and a polycarbonate sheet. The light transmissive layer 104 has a thickness of, for example, 100 μm. The total thickness of the optical disc including the light transmissive layer 104 and the substrate 101 with a thickness of about 1.1 mm is about 1.2 mm.

In the optical recording medium 100, laser light Lb is incident on a surface of the light transmissive layer 104 and recording or reproduction is performed on any one of the recording layers L0 to L2. Hereinafter, the surface of the light transmissive layer 104 is referred to as a "laser incident surface 100a" since laser light for recording and reproduction is incident on the surface of the light transmissive layer 104 in the optical recording medium 100.

Hereinafter, the stacking direction of the recording layers L in the optical recording medium 100 is referred to as a "layer direction". In addition, the side of the laser incident surface 100a in the layer direction is referred to as a "front side" and a side opposite to the laser incident surface 100a is referred to as a "rear side".

Figure 2:
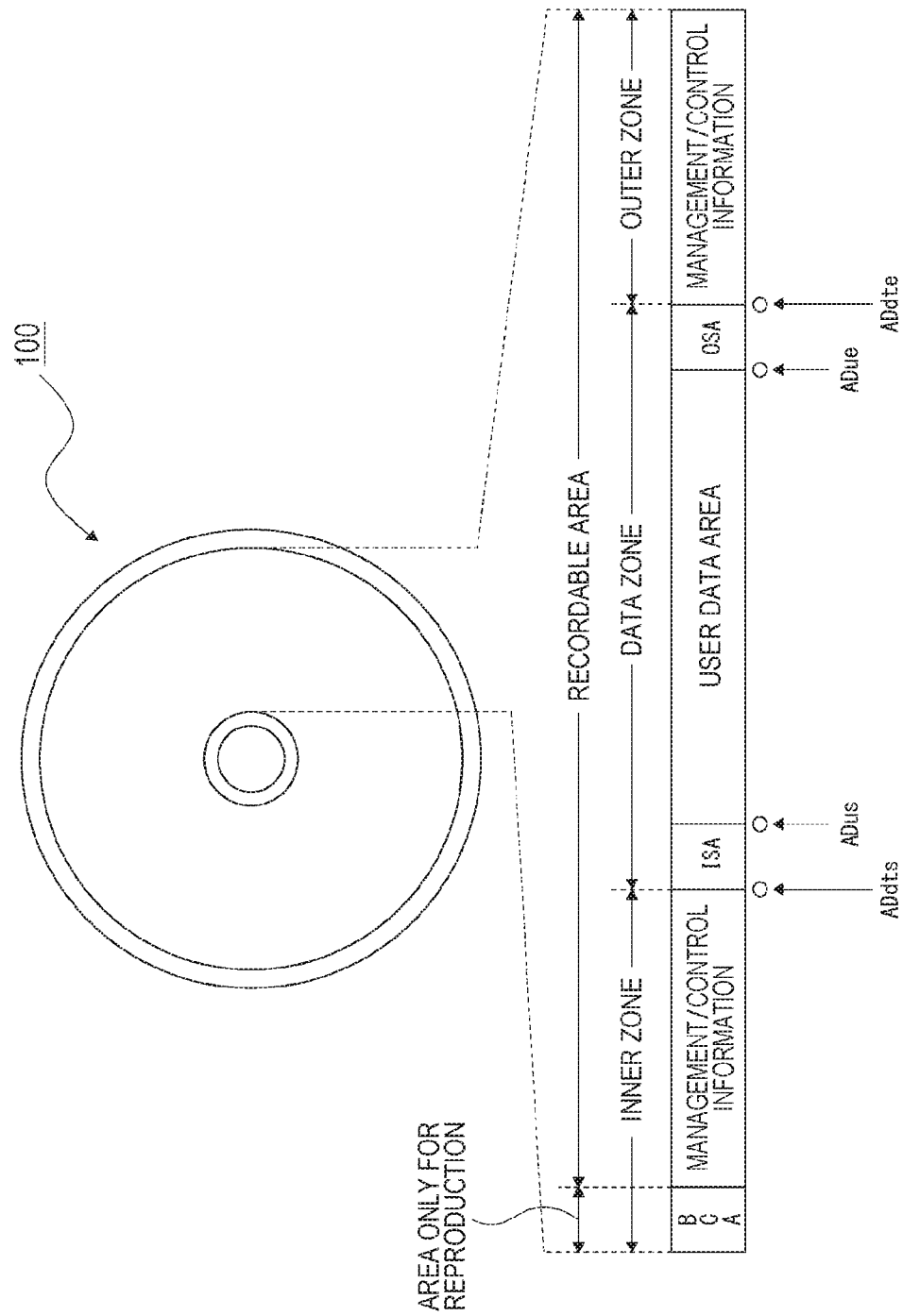
FIG. 2 is a diagram illustrating the outline of the layout of each recording layer in the optical recording medium according to the embodiment.

FIG. 2 illustrates the outline of the layout (area configuration) of each recording layer L in the optical recording medium 100.

An inner zone, a data zone, and an outer zone are arranged as the areas of each recording layer L from an inner circumferential side.

As the configuration of the areas related to recording and reproduction, an innermost circumferential area in the inner zone (read-in area) is an area only for reproduction and an area from the other area of the inner zone to the outer zone is a recordable area.

For example, a burst cutting area (BCA) is provided in the area only for reproduction.

Furthermore, in the inner zone, for example, an OPC area, a TDMA area, and a reserved area, which will be described below, are formed in the recordable area in order to record management/control information.

In the area only for reproduction and the recordable area, a recording track having wobbling grooves (meandering grooves) is formed in a spiral shape. The grooves function as a tracking guide when tracing is performed by a laser spot. In addition, the grooves function as a recording track and are used to record or reproduce data.

Note that, in this example, it is assumed that data is recorded in the grooves.

Furthermore, the grooves functioning as a recording track has a meandering shape corresponding to a wobble signal. Therefore, a drive device (a drive device 50 which will be described below) for the optical recording medium 100 detects the position of both edges of the groove from light reflected from the laser spot emitted to the groove and extracts a change component in the position of both edges of the groove in the radial direction of the disc when the laser spot is moved along the recording track. In this way, it is possible to reproduce the wobble signal.

The address information (for example, a physical address or other additional information) of the recording track at the recording position is modulated in the wobble signal. Therefore, the drive device can demodulate the address information from the wobble signal to perform, for example, address control when data is recorded or reproduced.

For example, the inner zone illustrated in FIG. 2 is an area that is within a radius of 24 mm.

In the inner zone, the unique ID of the optical recording medium 100 is recorded in the BCA by, for example, a recording method that burns out the recording layer L. That is, recording marks are formed so as to be concentrically arranged, thereby forming barcode-shaped recording data.

Furthermore, in the inner zone, a predetermined area format having a temporary defect management area (TDMA), an optimum power control (OPC) area, and a reserved area is set. The OPC area is used for, for example, test writing when data recording/reproduction conditions, such as recording/reproduction laser power, are set. That is, the OPC area is used to adjust the recording/reproduction conditions.

The data zone is within a radius of 24.0 mm to 58.0 mm from the outer circumferential side of the inner zone. The data zone is an area in which user data is actually recorded or reproduced. Note that FIG. 2 is a conceptual diagram illustrating a start address ADdts and an end address ADdte of the data zone.

In the data zone, an inner spare area (ISA) is provided in an innermost circumferential portion and an outer spare area (OSA) is provided in an outermost circumferential portion. The ISA and the OSA are replacement areas for defects or data rewriting (overwriting).

The ISA is formed with a predetermined cluster size (1 cluster=65536 bytes) from the start position of the data zone.

The OSA is formed with a predetermined cluster size from the end position to the inner circumferential side of the data zone.

In the data zone, a section interposed between the ISA and the OSA is a user data area. The user data area is a general recording/reproduction area that is generally used to record or reproduce user data. FIG. 2 is a conceptual diagram illustrating a start address ADus and an end address ADue of the user data area.

Here, in the recording system of the optical recording medium 100 according to this example, recording can be performed in the data zone at a higher speed and a higher density (line direction density) than that in the inner zone.

The outer zone (for example, read-out zone) is within a radius of 58.0 mm to 58.5 mm from the outer circumferential side of the data zone. In the outer zone, management/control information is formed in a predetermined format.

Figure 3:
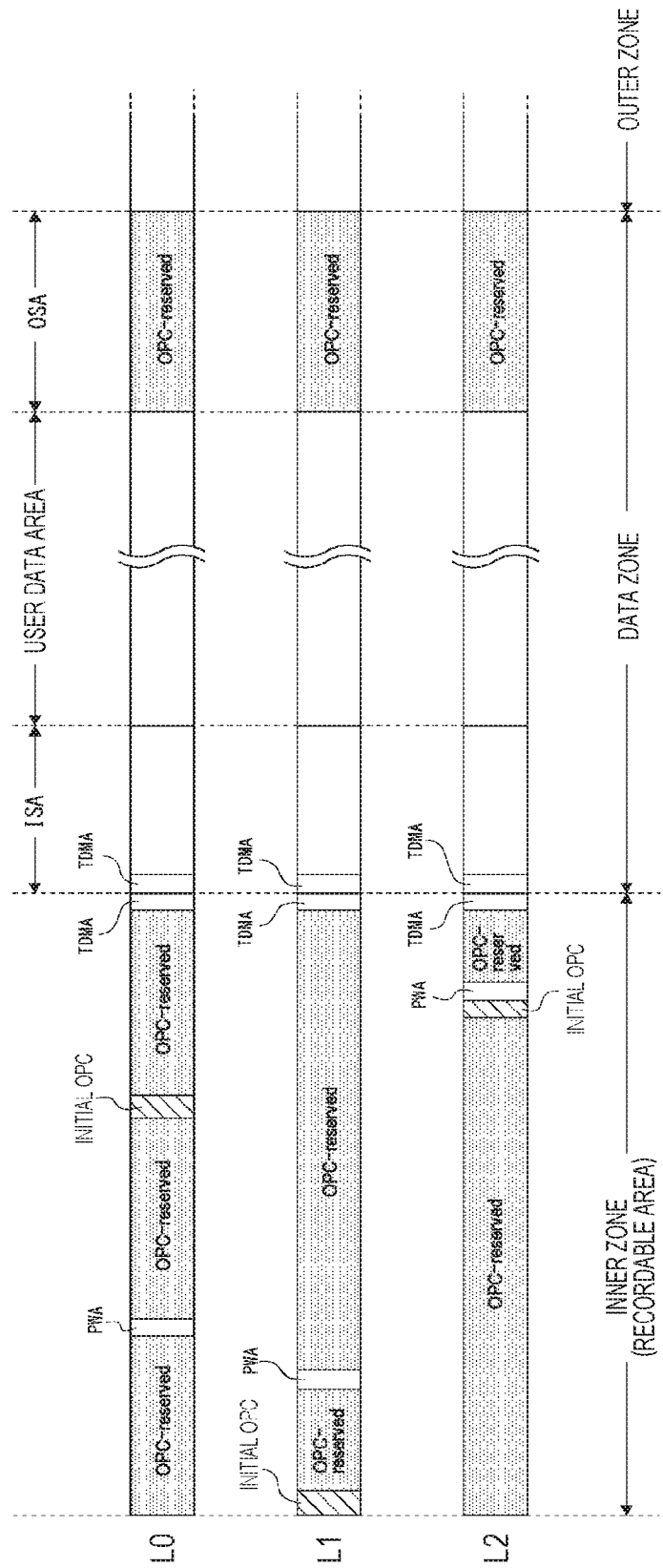
FIG. 3 is a diagram illustrating an example of the detailed layout of each recording layer.

FIG. 3 illustrates an example the detailed layout of each recording layer L in this example. Note that, in FIG. 3, the BCA is not illustrated.

As illustrated in FIG. 3, in the layout of each recording layer L in this example, a pre-write area (PWA), an initial OPC area, and a TDMA are provided at predetermined positions in the inner zone and areas other than the pre-write area, the initial OPC area, and the TDMA in the inner zone are reserved areas of the OPC area ("OPC-reserved" in FIG. 3).

Note that the pre-write area is an area for adjusting, for example, a servo operation.

The initial OPC area is an area that is to be used for laser power adjustment before a recording operation when the recording operation is performed as a format process for the optical recording medium 100 in an unrecorded state as a so-called black disc.

The reserved area (hereinafter, referred to as an "OPC reserved area") of the OPC area is an area in which the OPC area used for laser power adjustment, which is performed before a recording operation, can be set when the recording operation is performed after the format process. In this example, the OPC area can be set at any position in the OPC reserved area.

Information for managing information recorded on the optical recording medium 100, such as replacement management information for defect management or management/control information for rewriting data on a write-once disc, is recorded in the TDMA. In particular, management information of the ISA or the OSA is also recorded as management information related to the replacement process in the TDMA. For example, a change in the recording state of the optical recording medium 100 which is caused by the recording of new information on the optical recording medium 100 by the replacement process is reflected in the TDMA and the content of the change is sequentially updated in the TDMA. Therefore, the drive device additionally records the information of the TDMA each time (for example, the drive device records the latest information whenever a disc is ejected).

In this example, the TDMA includes a temporary defect list (TDFL) or a temporary disc definition structure (TDDS), as disclosed in, for example, the following Reference Literature 1:

Reference Literature 1: Japanese Patent Application Laid-Open No. 2008-293571

In this example, one TDMA is provided in the inner zone of each recording layer L. Specifically, in this case, the TDMA in the inner zone is provided in the outermost circumferential area of the inner zone in each recording layer L.

Then, in this example, the TDMA is also provided in the innermost circumferential area of the data zone in each recording layer L.

In this case, the TDMA provided in the inner zone is used first and the TDMA provided in the data zone is used next.

That is, after the TDMA provided in the inner zone is used, the TDMA provided in the data zone is used.

Furthermore, in the layout according to this example, the OPC reserved area is also provided in the data zone of each recording layer L. Specifically, the OPC reserved area is provided for the OSA in each recording layer L.

Here, the arrangement of the pre-write area, the initial OPC area, and the OPC reserved area in the inner zone varies depending on the recording layers L, as illustrated in the drawings.

For example, in the recording layer L0, the areas are arranged in the order of the OPC reserved area, the pre-write area, the OPC reserved area, the initial OPC area, the OPC reserved area, and the TDMA from the inner circumferential side. In addition, in the recording layer L1, the areas are arranged in the order of the initial OPC area, the OPC reserved area, the pre-write area, the OPC reserved area, and the TDMA from the inner circumferential side. In the recording layer L2, the areas are arranged in the order of the OPC reserved area, the initial OPC area, the pre-write area, the OPC reserved area, and the TDMA.

For the initial OPC area, the initial OPC area in the recording layer L0 is arranged closer to the inner circumferential side than the initial OPC area in the recording layer L2. Furthermore, for the pre-write area, the pre-write area in the recording layer L1 is arranged closer to the inner circumferential side than the pre-write area in the recording layer L0 and the pre-write area in the recording layer L2 is arranged closer to the outer circumferential side than the pre-write area in the recording layer L0.

2. Configuration of Drive Device

Next, the drive device (recording/reproducing device) 50 corresponding to the optical recording medium 100 will be described.

In this example, the drive device 50 performs a format process for the optical recording medium 100 in a blank state in which no data is recorded in the recordable area. In addition, the drive device 50 performs a data recording/reproduction process for the user data area of the formatted optical recording medium 100. If necessary, the drive device 50 performs a data recording/reproduction process for the TDMA, the ISA, and the OSA.

Figure 4:
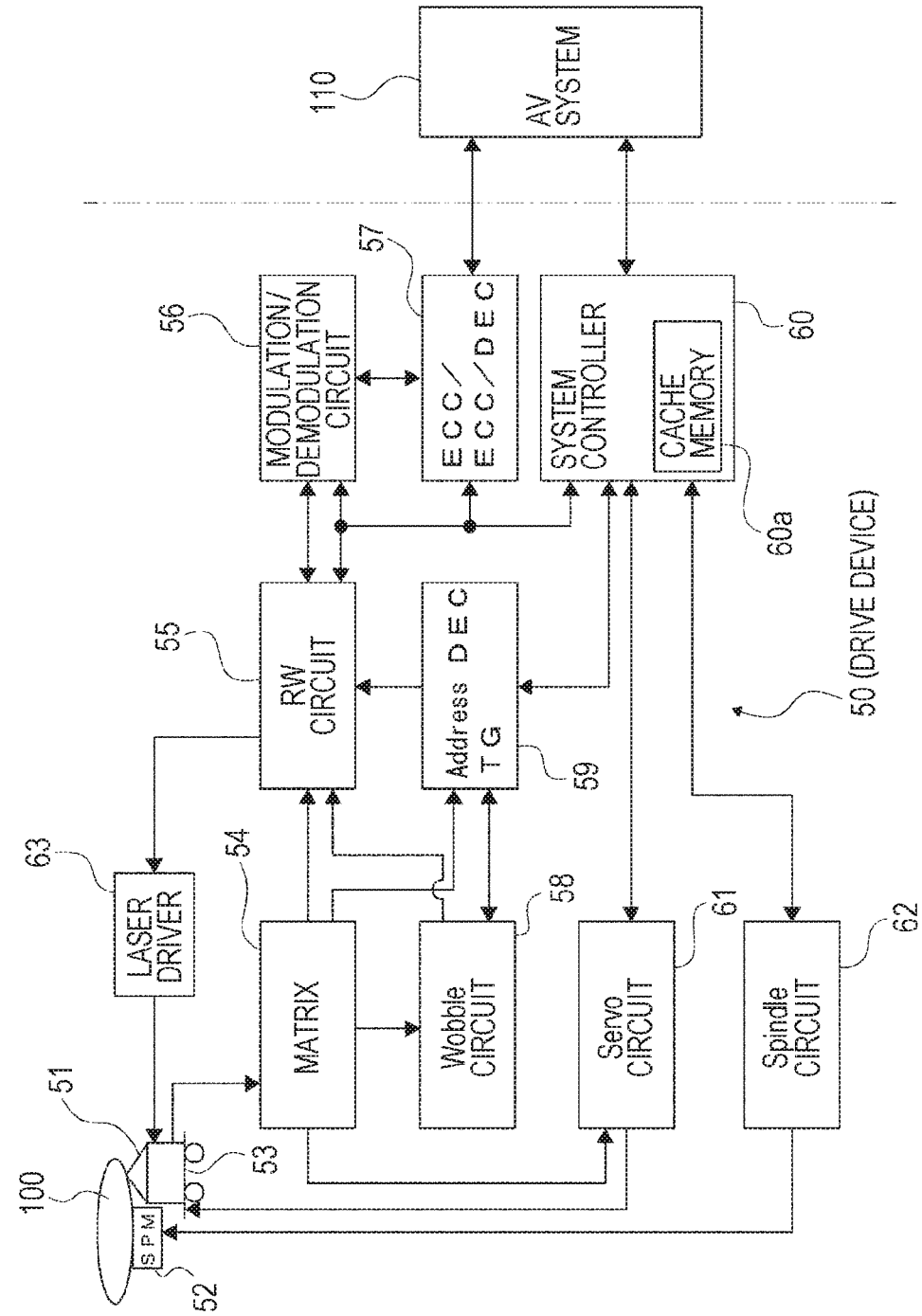
FIG. 4 is a block diagram illustrating the internal configuration of a drive device (recording/reproducing device) according to the embodiment.

FIG. 4 is a block diagram illustrating the internal configuration of the drive device 50.

The optical recording medium 100 is placed on a turntable (not illustrated) and is rotated at a constant linear velocity (CLV) by a spindle motor (SPM) 52 during a recording/reproduction operation. Then, an optical pickup (optical head) 51 reads, for example, address information which has been embedded as wobbling of the groove track on the optical recording medium 100.

Furthermore, during a format process or a user data recording process, the optical pickup 51 records management/control information or user data on the track in the recordable area. The optical pickup 51 reads the recorded data during a reproduction process.

The optical pickup 51 includes a laser diode serving as a laser light source, a photodetector for detecting reflected light, an objective lens which is a laser light output end, and an optical system (not illustrated) which emits laser light to a recording surface of a disc through the objective lens and guides reflected light to the photodetector.

In the optical pickup 51, the objective lens is held so as to be movable in a tracking direction and a focus direction by a biaxial mechanism. In addition, the entire optical pickup 51 can be moved in the radial direction of the optical recording medium 100 by a thread mechanism 53.

In the optical pickup 51, the laser diode is driven to emit laser light in response to a drive signal (drive current) from a laser driver 63.

Reflected light information from the optical recording medium 100 is detected by the photodetector in the optical pickup 51, is converted into an electric signal corresponding to the amount of light received, and is supplied to a matrix circuit 54. The matrix circuit 54 includes, for example, a current/voltage conversion circuit and a matrix operation/amplification circuit which correspond to an output current from a plurality of light receiving elements as photodetectors and generates necessary signals using a matrix operation process.

For example, the matrix circuit 54 generates a high-frequency signal (reproduction data signal) corresponding to reproduction data, a focus error signal for servo control, and a tracking error signal.

In addition, the matrix circuit 54 generates a signal related to groove wobbling, that is, a push-pull signal as a signal for detecting wobbling.

Note that, in some cases, the matrix circuit 54 is integrally provided in the optical pickup 51.

The reproduction data signal output from the matrix circuit 54 is supplied to a reader/writer circuit 55. In addition, the focus error signal and the tracking error signal are supplied to a servo circuit 61 and the push-pull signal is supplied to a wobble circuit 58.

The reader/writer circuit 55 performs, for example, a binarization process and a reproduction clock generation process using a phase locked loop (PLL) for the reproduction data signal to reproduce the data read by the optical pickup 51 and supplies the reproduced data to a modulation/demodulation circuit 56. The modulation/demodulation circuit 56 includes a functional unit that serves as a decoder during reproduction and a functional unit that serves as an encoder during recording. During reproduction, a process of demodulating a run length limited code on the basis of the reproduction clock is performed as a decoding process.

Furthermore, an error correction code (ECC) encoder/decoder 57 performs an ECC encoding process that adds an error correction code during recording and an ECC decoding process that performs error correction during reproduction.

During reproduction, the data demodulated by the modulation/demodulation circuit 56 is stored in an internal memory and, for example, an error detection/correction process and a deinterleaving process are performed to obtain reproduction data.

Data obtained by decoding the reproduction data with an ECC encoder/decoder 57 is read on the basis of an instruction from a system controller 60 and is transmitted to an apparatus connected to the drive device, for example, an audio-visual (AV) system 110.

The wobble circuit 58 processes the push-pull signal which is output as the signal related to groove wobbling from the matrix circuit 54. The push-pull signal is demodulated into a data stream forming address information by the wobble circuit 58 and is supplied to an address decoder 59. The address decoder 59 decodes the supplied data to obtain an address value and supplies the address value to the system controller 60.

In addition, the address decoder 59 generates a clock with the PLL process using the wobble signal supplied from the wobble circuit 58 and supplies the clock as, for example, an encoding clock during recording to each unit.

During recording, recording data is transmitted from the AV system 110. The recording data is transmitted to a memory in the ECC encoder/decoder 57 and is buffered in the memory. In this case, the ECC encoder/decoder 57 performs, for example, an error correction code addition process, an interleaving process, or a sub-code addition process as the process of encoding the buffered recording data.

In addition, the modulation/demodulation circuit 56 modulates the ECC-encoded data into a predetermined run length limited code, using, for example, an RLL (1-7) PP method, and the modulated run length limited code is supplied to the reader/writer circuit 55.

As described above, a clock generated from the wobble signal is used as an encoding clock which is a reference clock for the encoding process during recording.

For example, the reader/writer circuit 55 performs, as a recording compensation process, a process of finely adjusting recording power so as to be most suitable for the characteristics of the recording layers L, the spot shape of laser light, and recording linear velocity or a process of adjusting a laser drive pulse for the recording data generated by the encoding process. The processed recording data is transmitted as a laser drive pulse to the laser driver 63.

The laser driver 63 transmits the supplied laser drive pulse to the laser diode in the optical pickup 51 and the laser diode is driven to emit laser beam. In this way, a mark corresponding to the recording data is formed on the optical recording medium 100.

Note that the laser driver 63 includes a so-called auto power control (APC) circuit and performs control such that the output of the laser is constant, regardless of, for example, temperature while monitoring the output power of the laser on the basis of the output of a detector for monitoring laser power which is provided in the optical pickup 51. The system controller 60 gives the target value of the output of the laser during recording and during reproduction. The laser driver 63 performs control such that the output level of the laser is equal to the target value during recording and during reproduction.

The servo circuit 61 generates various servo drive signals, such as a focus signal, a tracking signal, and a thread signal, from the focus error signal and the tracking error signal from the matrix circuit 54 and performs a servo operation. That is, the servo circuit 61 generates a focus drive signal and a tracking drive signal on the basis of the focus error signal and the tracking error signal and drives a focus coil and a tracking coil of the biaxial mechanism in the optical pickup 51. In this way, a tracking servo loop and a focus servo loop are formed by the optical pickup 51, the matrix circuit 54, the servo circuit 61, and the biaxial mechanism.

Furthermore, the servo circuit 61 turns off the tracking servo loop, outputs a jump drive signal, and performs a track jump operation, in response to a track jump command from the system controller 60.

Furthermore, the servo circuit 61 generates a thread error signal obtained as a low-frequency component of the tracking error signal or generates a thread drive signal on the basis of access execution control from the system controller 60 and drives the thread mechanism 53. The thread mechanism 53 includes a mechanism formed by, for example, a main shaft for holding the optical pickup 51, a thread motor, and a transmission gear, and drives the thread motor in response to the thread drive signal such that a predetermined sliding operation of the optical pickup 51 is performed.

A spindle servo circuit 62 performs control such that the spindle motor 52 is rotated at CLV.

The spindle servo circuit 62 obtains a clock generated by performing a PLL process for the wobble signal as the current rotation speed information of the spindle motor 52 and compares the clock with predetermined CLV reference speed information to generate a spindle error signal.

In addition, when data is reproduced, a reproduction clock (a reference clock for a decoding process) generated by the PLL process in the reader/writer circuit 55 becomes the current rotation speed information of the spindle motor 52. Therefore, the reproduction clock may be compared with the predetermined CLV reference speed information to generate the spindle error signal.

Then, the spindle servo circuit 62 outputs a spindle drive signal which has been generated according to the spindle error signal to control the spindle motor 62 such that the spindle motor 62 is rotated at CLV. In addition, the spindle servo circuit 62 generates the spindle drive signal to, for example, start, stop, accelerate, and decelerate the spindle motor 52, in response to a spindle kick/brake control signal from the system controller 60.

Various operations of the servo system and the recording/reproducing system are controlled by the system controller 60 which is a microcomputer.

The system controller 60 performs various processes in response to commands from the AV system 110.

For example, when the AV system 110 outputs a write instruction (write command), first, the system controller 60 moves the optical pickup 51 to the address where data is to be written. Then, the ECC encoder/decoder 57 and the modulation/demodulation circuit 56 perform an encoding process for the data transmitted from the AV system 110, as described above. Then, as described above, the laser drive pulse from the reader/writer circuit 55 is supplied to the laser driver 63 and recording is performed.

Furthermore, for example, in a case where the AV system 110 supplies a read command to require the transmission of data recorded on the optical recording medium 100, first, seek operation control is performed for a designated address. That is, the system controller 60 outputs a command to the servo circuit 61 such that the optical pickup 51 accesses the address designated by a seek command. Then, the system controller 60 performs operation control required to transmit data in a designated data section to the AV system 110. That is, the system controller 60 performs control such that data is read from the optical recording medium 100, instructs the reader/writer circuit 55, the modulation/demodulation circuit 56, and the ECC encoder/decoder 57 to, for example, decode and buffer the data, and transmits the required data.

In addition, when the data is recorded or reproduced, the system controller 60 can perform an access process or a recording/reproduction operation, using address information detected by the wobble circuit 58 and the address decoder 59.

FIG. 4 illustrates a cache memory 60*a* provided in the system controller 60. For example, the cache memory 60*a* is used to store a TDFL/space bit map read from the TDMA of the optical recording medium 100 or to update the TDFL/space bit map.

For example, when the optical recording medium 100 is inserted, the system controller 60 controls each unit such that the TDFL/space bit map recorded in the TDMA is read and the read information is stored in the cache memory 60*a*. Then, when data is written or a replacement process is performed due to a defect, the system controller 60 updates the TDFL/space bit map stored in the cache memory 60*a*. For example, whenever the replacement process is performed due to the writing or rewriting of data and the space bit map or the TDFL is updated, the system controller 60 may additionally record the TDFL or the space bit map in the TDMA of the optical recording medium 100. However, in this case, the TDMA of the optical recording medium 100 is consumed quickly. For this reason, for example, while the optical recording medium is ejected from the drive device 50, the TDFL/space bit map is updated in the cache memory 60*a*. Therefore, for example, when the optical recording medium is ejected, the final (latest) TDFL/space bit map in the cache memory 60*a* is written to the TDMA of the optical recording medium 100. With this structure, a plurality of operations of updating the TDFL/space bit map is collectively performed and the TDFL/space bit map is updated on the optical recording medium 100, which makes it possible to reduce the consumption of the TDMA of the optical recording medium 100. Note that this method for updating the TDMA on the optical recording medium 100 is not limited to the TDFL/space bit map and is similarly applied to various kinds of information which need to be updated in the TDMA.

Note that FIG. 4 illustrates an example of the configuration of the drive device 50 connected to the AV system 110. However, the drive device 50 may be connected to, for example, a personal computer. In addition, the drive device 50 may not be connected to other apparatuses. In this case, an operation unit or a display unit is provided or the configuration of a data input/output interface unit is different from that illustrated in FIG. 4. That is, data may be recorded or reproduced according to the operation of the user and a terminal unit for inputting and outputting various kinds of data may be formed.

3. Example of Setting of OPC Area and Example of Use of OPC Area

Next, the setting of the OPC area by the drive device 50 will be described.

In this embodiment, as illustrated in FIG. 3, the drive device 50 sets the OPC area in a predetermined OPC reserved area in each recording layer L of the optical recording medium 100. The setting of the OPC area is performed for the optical recording medium 100 in a blank state. That is, the setting is performed when a format process is performed.

In this example, information (hereinafter, referred to as "layout information") indicating the layout illustrated in FIG. 3 is stored in the drive device 50 in advance and the drive device 50 can read the layout information, with the insertion of the optical recording medium 100 in a blank state, and check the position of the OPC reserved area in each recording layer L.

In this example, the drive device 50 sets the OPC area, depending on the type of file system applied to the optical recording medium 100.

Here, it is assumed that the following first and second file systems are present as the file system which can be applied to the optical recording medium 100.

The first file system in which management information needs to be recorded in the inner zone of the recording layer L0 provided on the innermost side (the side opposite to the laser incident surface) even in a case where data has been recorded in any recording layer L and the amount of OPC area used in the inner zone of the recording layer L0 tends to be more than that in other recording layers L.

The second file system in which management information is recorded in the inner zone of the recording layer L in which data has been recorded and the amounts of OPC area used in the inner zones of each recording layer L tend to be substantially equal to each other.

Figure 5A:
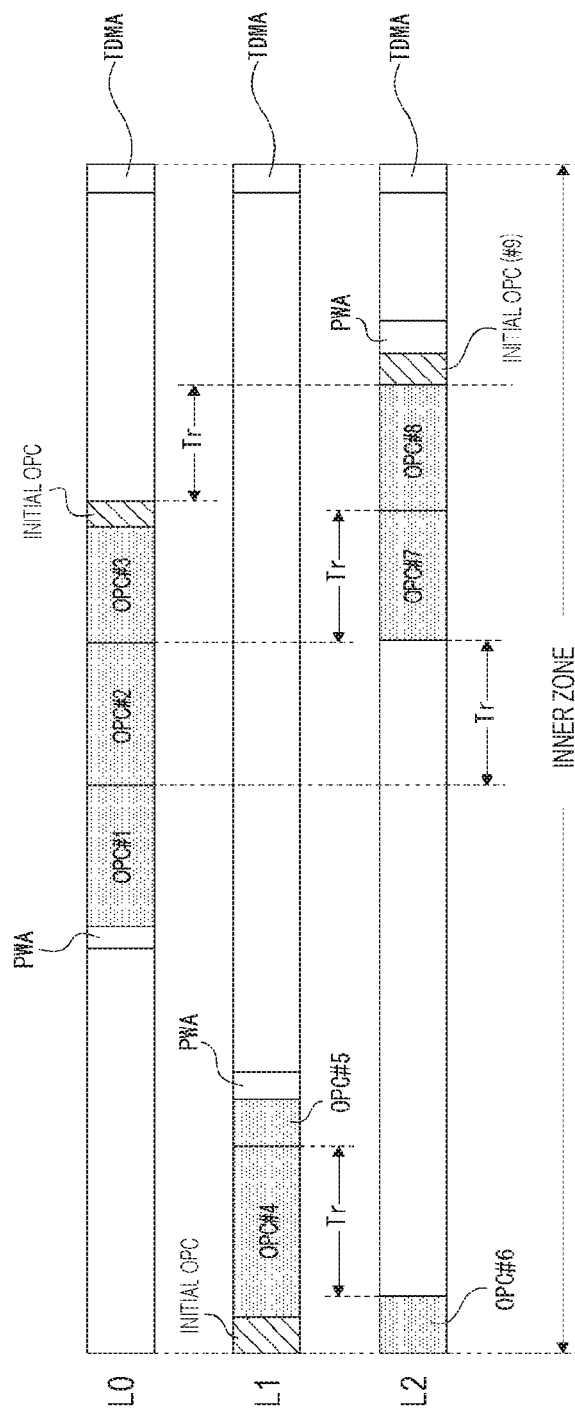
FIGS. 5A and 5B are diagrams illustrating an example of the setting of OPC areas corresponding to a case where a first file system is applied.
Figure 5B:
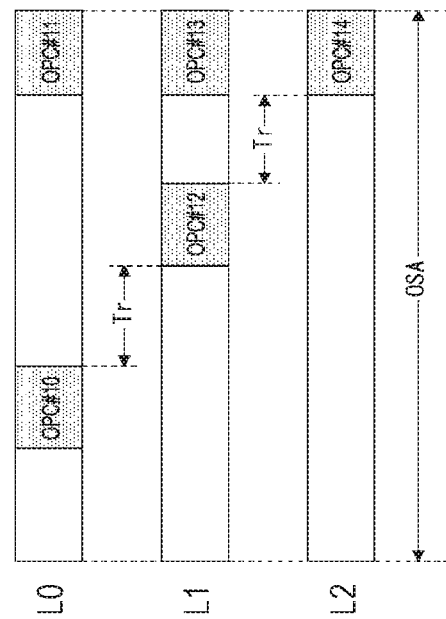
Figure 6A:
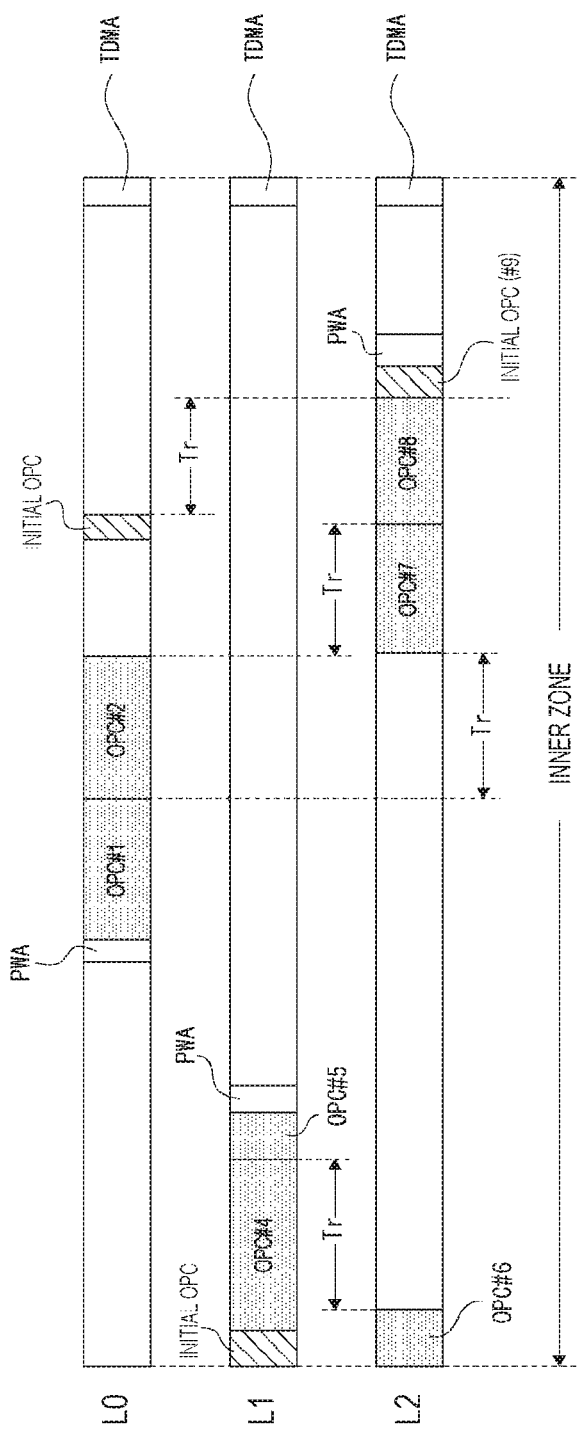
FIGS. 6A and 6B are diagrams illustrating an example of the setting of the OPC areas corresponding to a case where a second file system is applied.
Figure 6B:
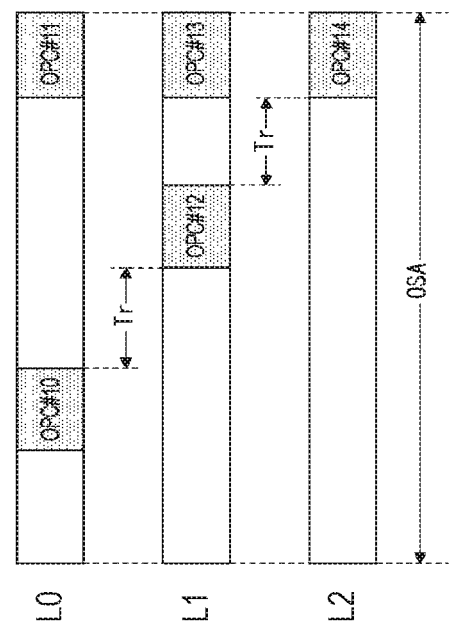

FIGS. 5A and 5B illustrate an example of the setting of the OPC area in a case where the first file system is applied and FIGS. 6A and 6B illustrate an example of the setting of the OPC area in a case where the second file system is applied.

Note that FIGS. 5A and 6A illustrate an example of the setting of the OPC area in the OPC reserved area of the inner zone and FIGS. 5B and 6B illustrate an example of the setting of the OPC area in the OPC reserved area in the OSA of the data zone.

In the above description, for convenience of explanation, the initial OPC area in the recording layer L2 is referred to as "OPC area #9".

As illustrated in FIG. 5A, in a case where the first file system is applied, three OPC areas #1 to #3 are set in the inner zone of the recording layer L0, two OPC areas #4 and #5 are set in the inner zone of the recording layer L1, and three OPC areas #6 to #8 are set in the inner zone of the recording layer L2.

The OPC areas #1 to #3, the OPC area #4, and the OPC areas #7 and #8 have substantially the same size. In addition, the size of each of the OPC areas #5 and #6 is about equal to or greater than half the size of each of the OPC areas #1 to #3, the OPC area #4, and the OPC areas #7 and #8.

Note that, in this example, the size of the OPC area to be set is greater than the size of the initial OPC area used in the format process.

For the distribution of the OPC areas in each recording layer L, the number of OPC areas distributed in the recording layer L0 is greater than the number of OPC areas distributed in the other recording layers L1 and L2 by the above-mentioned setting of the OPC areas illustrated in FIG. 5A. That is, the OPC areas are distributed so as to correspond to the first file system in which the amount of OPC area used in the inner zone of the recording layer L0 is more than that in the other recording layers L.

For the detailed arrangement of the OPC areas in each recording layer L, first, in the recording layer L0, the OPC reserved area provided between the pre-write area PWA and the initial OPC area is used and the OPC areas #1, #2, and #3 are set in this order from the inner circumferential side.

Furthermore, in the recording layer L1, the OPC reserved area provided between the initial OPC area and the pre-write area is used and the OPC areas #4 and #5 are set in this order from the inner circumferential side. In the OPC reserved area that is closer to the inner circumferential side than the initial OPC area in the recording layer L2, the OPC area #6 is set in an innermost circumferential portion and the OPC areas #7 and #8 are set in an area that is adjacent to the inner circumferential side of the initial OPC area in this order from the inner circumferential side.

Here, in this example, among the OPC areas #1 to #8 set as described above, the OPC areas #1, #4, 5, #7, and #8 are defined as areas that are used regardless of the usage of the OPC areas in the recording layers L provided on the front and rear sides in the layer direction (both the recording layers L provided on the front and rear sides for the OPC areas #4 and #5 in the recording layer L1). In addition, the initial OPC area including the OPC area #9 is defined as an area that is used regardless of the usage of the OPC areas that overlaps the OPC areas in the recording layers provided on the front and rear sides in the layer direction.

In this case, it is defined that the OPC areas #4 and #5 in the recording layer L1 are used in the order of #4 and #5. In addition, it is defined that the OPC areas #7 and #8 in the recording layer L2 are used in the order of #8 and #7. Note that, if the OPC areas include the OPC area #9 which is the initial OPC area, the OPC areas in the recording layer L2 are used in the order of #9, #8, and #7.

The OPC areas #2 and #3 in the recording layer L0 are defined as areas that are used when the OPC areas which are provided on the front side in the layer direction and overlap the OPC areas #2 and #3 have not been used. Specifically, in this example, assuming that the OPC areas #8 and #7 in the recording layer L2 that is closer to the front side than the recording layer L0 are used in the order of #8 and #7, the OPC area #3 is defined as an area that is used when the OPC area #8 provided on the front side has not been used (that is, which is synonymous with a case where both the OPC areas #8 and #7 have not been used) and the OPC area #2 is defined as an area that is used when the OPC area #7 provided on the front side has not been used.

That is, the OPC area provided on the rear side is used in a state in which the OPC area which is provided on the front side and overlaps the OPC area has not been used, which prevents a failure in the adjustment of laser power due to the influence of a change in the transmittance of the front-side recording layer.

Here, it should be considered that, in the optical recording medium having a plurality of recording layers L, the positional deviation (address shift) between the recording layers L may occur due to eccentricity. Hereinafter, the amount of positional deviation between the recording layers L which is assumed to occur due to eccentricity in the optical recording medium 100 is referred to as "the amount of positional deviation Tr".

The position (address) of each of the OPC areas #2, #3, #7, and #8 is set as follows, considering the positional deviation.

Specifically, the arrangement position of the OPC area #8 is set such the position of the inner-circumferential-side end of the OPC area #8 is separated from the position of the outer-circumferential-side end of the OPC area #2 to the outer circumferential side by a distance that is equal to or greater than the amount of positional deviation Tr. Therefore, it is possible to guarantee that a change in transmittance will not occur on the front side of the OPC area #2 even when the OPC area #8 is used.

Furthermore, the arrangement position of the OPC area #7 is set such the position of the inner-circumferential-side end of the OPC area #7 is separated from the position of the outer-circumferential-side end of the OPC area #1 to the outer circumferential side by a distance that is equal to or greater than the amount of positional deviation Tr. Therefore, it is possible to guarantee that a change in transmittance will not occur on the front side of the OPC area #1 even when the OPC area #7 is used.

Note that the arrangement position of the OPC area #9 is set such the position of the inner-circumferential-side end of the OPC area #9 is separated from the position of the outer-circumferential-side end of the initial OPC area in the recording layer L0 to the outer circumferential side by a distance that is equal to or greater than the amount of positional deviation Tr. Therefore, the initial OPC area in the recording layer L0 is not affected by a change in transmittance in the initial OPC area which is the OPC area #9 provided on the front side.

Furthermore, in this example, the OPC area #6 in the recording layer L2 is defined as an area that is used when the OPC area that is provided on the rear side in the layer direction and overlaps the OPC area #6 has been used. Specifically, the OPC area #6 is defined as an area that is used when the OPC area #4 provided on the rear side has been used.

In this case, in order to prevent the OPC area #5 from being affected by a change in transmittance in the OPC area #6 provided on the front side, the OPC area #5 is located such the position of the inner-circumferential-side end of the OPC area #5 (the position of the boundary between the OPC areas #4 and #5) is separated from the position of the outer-circumferential-side end of the OPC area #6 to the outer circumferential side by a distance that is equal to or greater than the amount of positional deviation Tr.

In addition, the drive device 50 sets the OPC area in the OPC reserved area of the OSA in the data zone of each recording layer L, as illustrated in FIG. 5B.

In this example, the OPC reserved area is arranged in the OSA (outer-circumferential-side end area) of the data zone and the OPC area is set in the OPC reserved area, considering, for example, a change in the recording characteristics in the plane.

In addition, the setting of the OPC area in the OPC reserved area arranged in the data zone makes it possible to derive recording conditions suitable for recording in the data zone. In particular, in a case where recording is performed in the data zone at a higher speed or a higher density than that in the inner zone as described above, recording conditions suitable for a recording speed or recording density in the data zone needs to be derived. Therefore, it is preferable to set the OPC area in the data zone.

The OPC area is set in the OPC reserved area of the OSA as follows. As illustrated in FIG. 5B, OPC areas #10 and #11 are set in the recording layer L0, OPC areas #12 and #13 are set in the recording layer L1, and OPC area #14 is set in the recording layer L2. In this example, the sizes of the OPC areas #10 to #14 set in the OSA are substantially equal to each other.

As illustrated in FIG. 5B, each of the OPC areas #11, #13, and #14 is set in the outermost circumferential portion of the OSA in the corresponding recording layer L. The OPC area #12 is set so as to be closer to the inner circumferential side than the OPC area #13 and the OPC area #10 is set so as to be closer to the inner circumferential side than the OPC area #12.

The OPC areas #10, #12, and #14 are defined as areas that are used, regardless of the usage of the OPC areas in the recording layers L provided on the front and rear sides in the layer direction (the recording layers L provided on both the front and rear sides for the OPC area #12 in the recording layer L1).

In contrast, the OPC areas #11 and #13 are defined as areas that are used when the OPC areas that are provided on the front side in the layer direction and overlap the OPC areas #11 and #13 have not been used.

In the OSA, in order to prevent the OPC area #12 from being affected by a change in transmittance in the OPC area #14 provided on the front side, the arrangement position of the OPC area #12 is set such the position of the outer-circumferential-side end of the OPC area #12 is closer to the inner circumferential side than the position of the inner-circumferential-side end of the OPC area #14, considering positional deviation caused by eccentricity. In addition, in order to prevent the OPC area #10 from being affected by a change in transmittance in the OPC area #12 provided on the front side, the arrangement position of the OPC area #10 is set such the position of the outer-circumferential-side end of the OPC area #10 is closer to the inner circumferential side than the position of the inner-circumferential-side end of the OPC area #12, Next, an example of the setting of the OPC area in a case where the second file system illustrated in FIGS. 6A and 6B is applied differs from the example of the setting illustrated in FIGS. 5A and 5B in that the OPC area #3 is not set in the inner zone.

The non-setting of the OPC area #3 in the recording layer L0 causes the OPC areas to be more uniformly distributed in each recording layer L than those in the example of the setting illustrated in FIGS. 5A and 5B. That is, this is suitable for the second file system in which the amounts of OPC areas used in each recording layer L tend to be substantially equal to each other.

In addition, the OPC area is set in the OPC reserved area of the data zone by a similar method to that in a case where the first file system is applied.

In this example, the drive device 50 sets the OPC area in the OPC reserved area during the format process. The drive device 50 records information indicating the position of the set OPC area in the TDMA (for example, the TDDS in the TDMA) of the optical recording medium 50 in the format process. Specifically, the drive device 50 records information indicating the start address of the OPC area and the length of the OPC area as the information indicating the position of the OPC area.

In addition, in a case where the set OPC area is used, the drive device 50 also records information indicating the next address (hereinafter, referred to as an "OPC-NW address" for convenience) that can be used in the OPC area in the TDMA (for example, the TDDS).

Furthermore, in this example, the drive device 50 additionally sets the OPC area, if necessary, in addition to setting the OPC area during the format process.

Specifically, in this example, in a case where it is determined that all of the OPC areas set in the inner zone and the data zone of each recording layer L are not available, a new OPC area is set in the data zone of the corresponding recording layer L. Specifically, a new OPC area is set in the user data area of the data zone.

In a case where the OPC area is additionally set in the data zone, the OPC area is additionally set in the recording layers L0 and L1 having the recording layer L on the front side on condition that the front-side recording layer L is in an unrecorded state. Specifically, in this example, in the user data area of the recording layer L in which the OPC area is to be additionally set, the OPC area is additionally set in an area which corresponds to the unrecorded area of the front-side recording layer L.

In a case where there is no unrecorded area which corresponds to the unrecorded area of the front-side recording layer L, the OPC area is not additionally set in the user data area.

In addition, for the recording layers L1 and L2 having the recording layer L on the rear side, the OPC area is preferentially additionally set in an area which corresponds to a recorded area of the rear-side recording layer L. Specifically, in the user data area of the recording layer L in which the OPC area is to be additionally set, the OPC area is preferentially additionally set in the unrecorded area which corresponds to the recorded area of the rear-side recording layer L.

Here, in the recording layer L1, the OPC area is additionally set, considering the recorded/unrecorded state of both the front-side recording layer L and the rear-side recording layer L. Specifically, in the user data area of the recording layer L1, the OPC area is preferentially additionally set in an unrecorded area which corresponds to an unrecorded area of the front-side recording layer L2 and a recorded area of the rear-side recording layer L0. In a case where there is no corresponding area, the OPC area is additionally set in an unrecorded area corresponding to the unrecorded area of the front-side recording layer L2.

In a case where the OPC area is additionally set as described above, the drive device 50 records information indicating the position of the additionally-set OPC area. In a case where the OPC area is used, the drive device 50 records information indicating the next address that can be used in the OPC area in the TDMA (for example, the TDDS). Note that, in this case, preferably, the recording time, for example, the ejection time of the optical recording medium 100 is set such that the update frequency of the management/control information of the optical recording medium 100 is reduced.

Note that while the case where the information indicating the position of the set OPC area (and the information indicating the next address that can be used) is recorded in the TDMA has been described above, the information may be recorded on the optical recording medium 100 such that it can be reproduced and acquired by other drive devices 50. A detailed recording aspect is not particularly limited.

4. Procedure

A process for achieving the example of the setting of the OPC area and the example of the use of the OPC area in the above-described embodiment will be described with reference to the flowcharts illustrated in FIGS. 7 to 13.

Note that, for example, the system controller 60 of the drive device 50 performs the process illustrated in FIGS. 7 to 13 according to a program stored in a predetermined storage device, such as read only memory (ROM), in the system controller 60.

Figure 7:
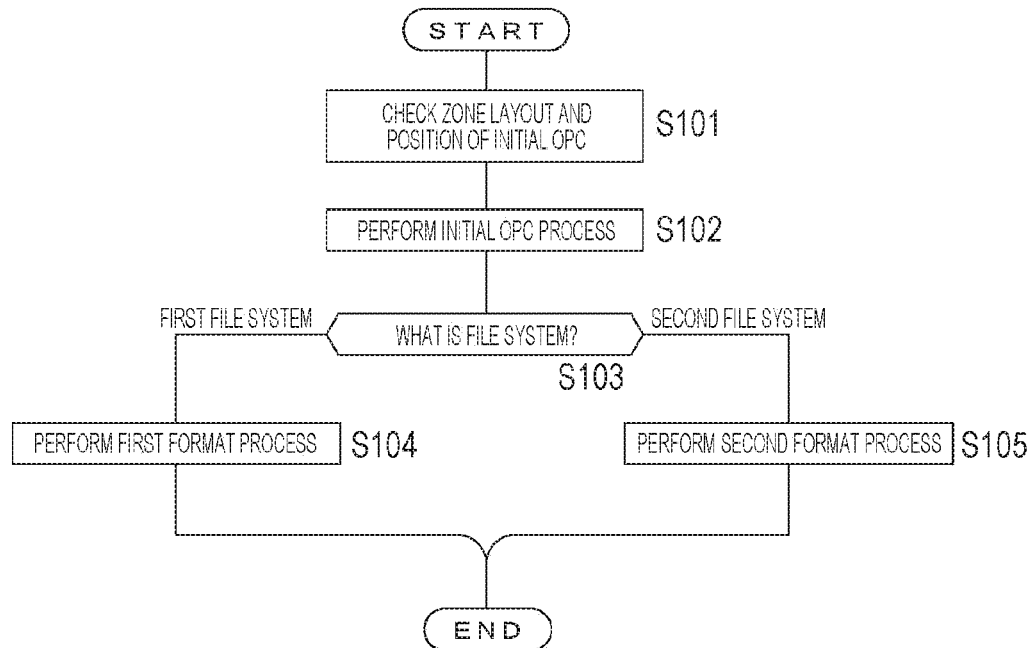
FIG. 7 is a flowchart illustrating a process related to the setting of the OPC areas.

FIG. 7 illustrates the process related to the setting of the OPC area.

Note that the process illustrated in FIG. 7 is performed in a case where it is determined that the optical recording medium 100 in a blank state (unformatted state) has been inserted into the drive device 50.

In FIG. 7, the system controller 60 checks the zone layout of the inserted optical recording medium 100 and checks the position of the initial OPC area. As described above, the drive device 50 stores layout information indicating the zone layout of the optical recording medium 100 and the system controller 60 checks the position of the initial OPC area on the basis of the layout information.

Then, in Step S102, the system controller 60 performs an initial OPC process. That is, the system controller 60 controls the servo circuit 61 and the spindle servo circuit 62 such that the optical pickup 51 accesses the initial OPC area. In addition, the system controller 60 supplies a signal as an OPC test pattern from the reader/writer circuit 55 to the laser driver 63 such that test recording is performed for the OPC area. Furthermore, the system controller 60 reproduces the recorded OPC area, obtains the evaluation value of a reproduction information signal, for example, jitter, asymmetry, and an error rate, and determines optimum recording laser power. Then, the system controller 60 sets laser power to the optimum power.

Then, in Step S103, the system controller 60 determines the type of file system to be applied to the optical recording medium 100. That is, in this example, the system controller 60 determines whether the file system is the first file system or the second file system. Note that, for example, the AV system 110 notifies the type of file system to be applied to the optical recording medium 100.

In a case where the file system is the first file system, in Step S104, the system controller 60 performs a first format process and ends the process illustrated in FIG. 7. In a case where the file system is the second file system, in Step S105, the system controller 60 performs a second format process and ends the process illustrated in FIG. 7.

As the first format process in Step S104, a process is performed which records at least information indicating the start address ADdts and the end address ADdte of the data zone and the start address ADus and the end address ADue of the user data area illustrated in FIG. 2 and information indicating the position of each OPC area set by the arrangement aspects described in FIGS. 5A and 5B in the TDMA of the optical recording medium 100.

In addition, as the second format process in Step S105, a process is performed which records at least the information indicating the start address ADdts and the end address ADdte of the data zone and the start address ADus and the end address ADue of the user data area and information indicating the position of each OPC area set by the arrangement aspects described in FIGS. 6A and 6B in the TDMA of the optical recording medium 100.

Note that, in this example, during the format process, the positional information of the initial OPC area, for example, the positional information of at least the initial OPC area #9 is also recorded in the TDMA.

Figure 8:
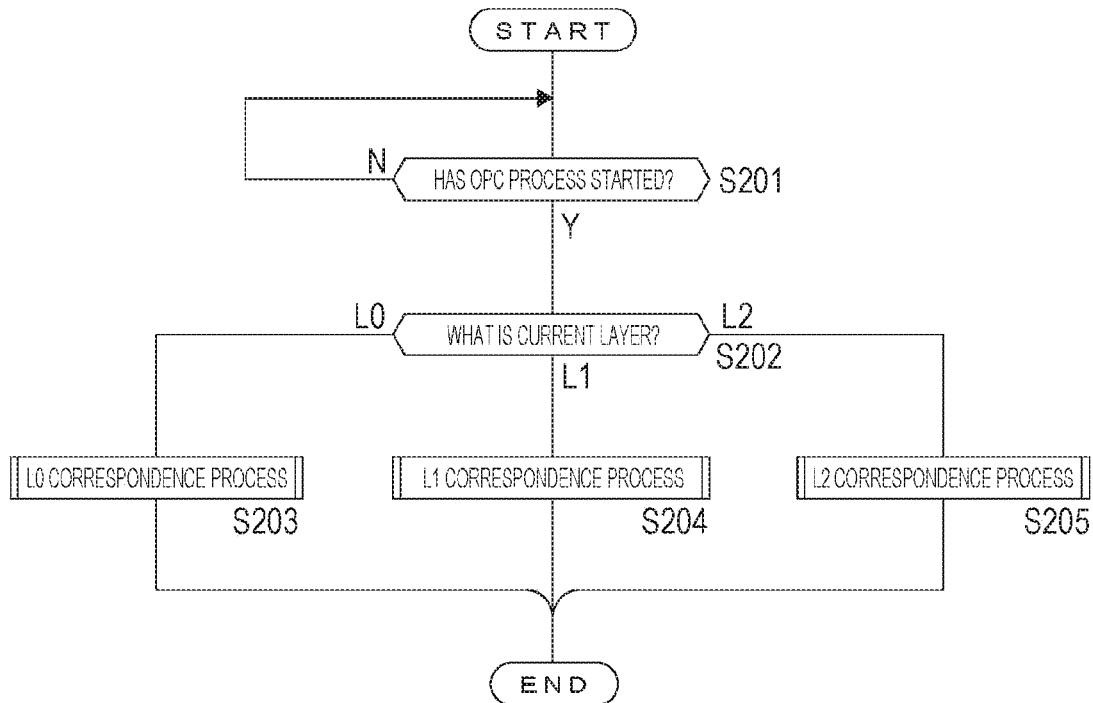
FIG. 8 is a flowchart illustrating a process related to the use of the set OPC area.

FIG. 8 illustrates the process related to the use of the set OPC area.

In FIG. 8, in Step S201, the system controller 60 waits until an OPC process (except the initial OPC process during the format process) is to start. In a state in which the OPC process starts, in Step S202, the system controller 60 determines the recording layer L (current layer) to be subjected to the OPC process.

When the current layer is the recording layer L0, the system controller 60 performs an L0 correspondence process in Step S203. When the current layer is the recording layer L1, the system controller 60 performs an L1 correspondence process in Step S204. When the current layer is the recording layer L2, the system controller 60 performs an L2 correspondence process in Step S205. Then, the system controller 60 ends the process illustrated in FIG. 8.

Note that, next, the L0 correspondence process (S203), the L1 correspondence process (S204), and the L2 correspondence process (S205) will be described. For the L0 correspondence process, a process corresponding to the optical recording medium 100 to which the first file system has been applied is described as an example. A process corresponding to the optical recording medium 100 to which the second file system has been applied will be described below.

Figure 9:
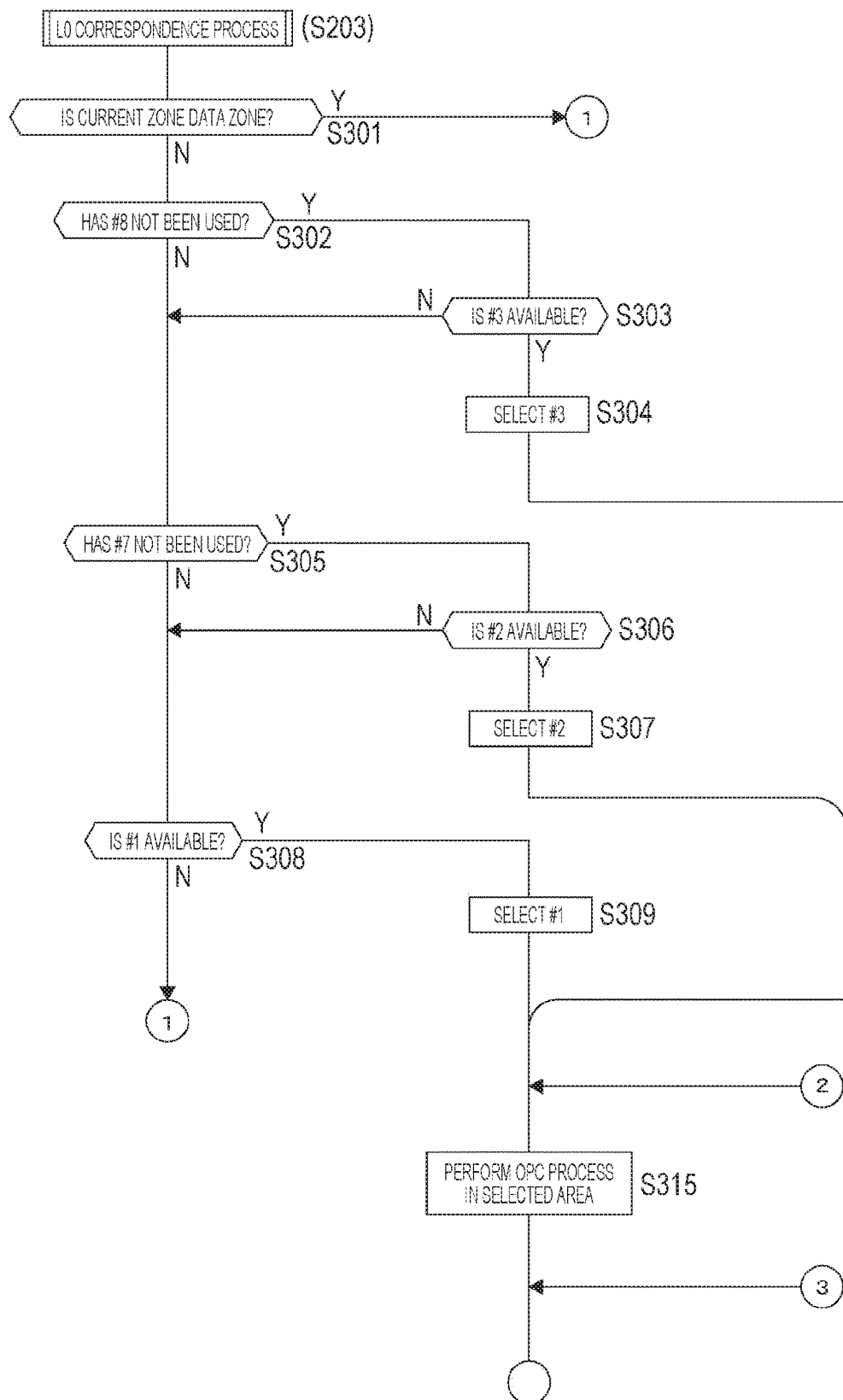
FIG. 9 is a flowchart illustrating an L0 correspondence process.
Figure 10:
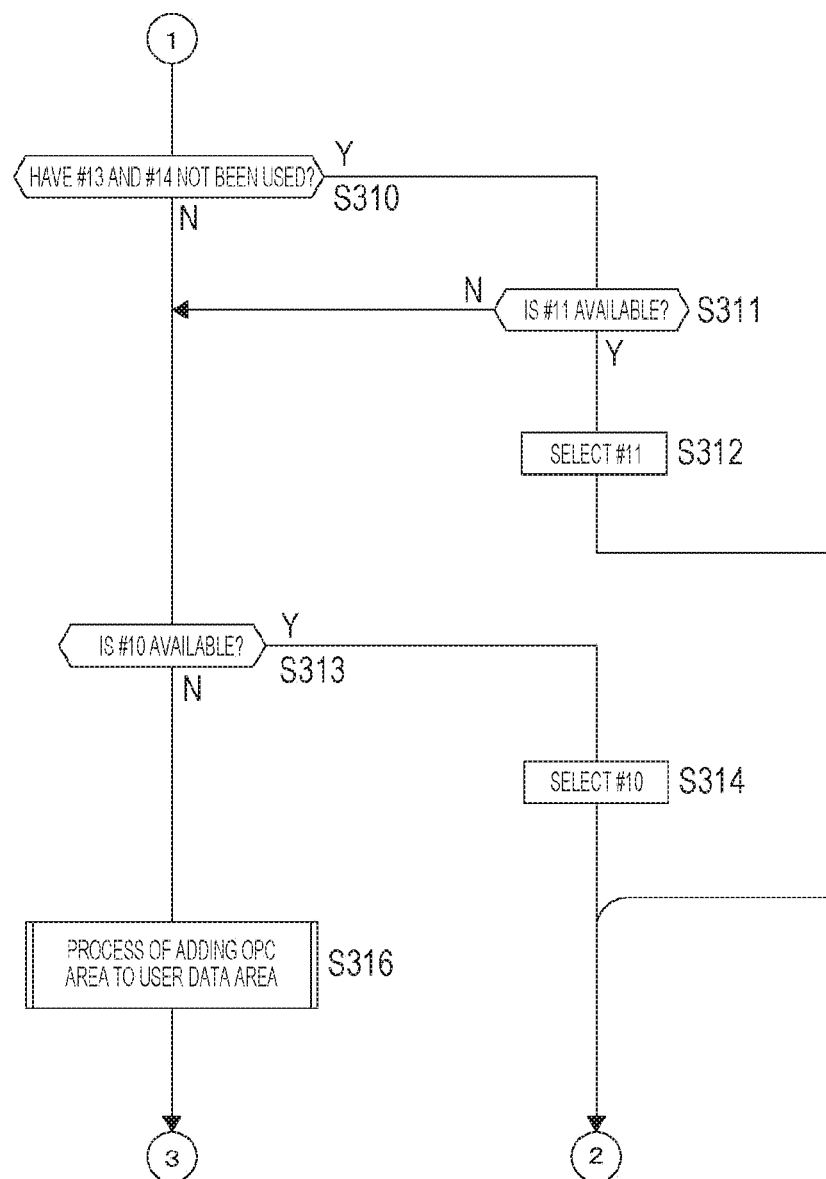
FIG. 10 is a flowchart illustrating the L0 correspondence process.

FIGS. 9 and 10 illustrate the L0 correspondence process in Step S203.

In FIG. 9, in Step S301, the system controller 60 determines whether the current zone is the data zone. That is, the system controller 60 determines whether the zone to be subjected to the OPC process is the data zone of the recording layer L0.

When the current zone is the data zone, the system controller 60 proceeds to Step S310 illustrated in FIG. 10. In addition, the process illustrated in FIG. 10 will be described below.

When the current zone is not the data zone, the system controller 60 proceeds to Step S302 and determines whether the OPC area #8 has not been used.

At that time, the system controller 60 determines whether the current OPC area has not been used, on the basis of the information indicating the position of the OPC area recorded on the optical recording medium 100. For example, in this example, the system controller 60 determines whether the current OPC area (#8 in Step S302) has not been used, on the basis of information indicating the start address and the OPC-NW address of the OPC area recorded in the TDMA. Specifically, whether the start address and the OPC-NW address of the current OPC area are identical to each other is determined in order to determine whether the current OPC area has not been used.

Here, for example, during a start-up process that starts with the insertion of the optical recording medium 100, the system controller 60 performs a reproduction operation in advance to cache (store) the information, which includes the information about the start address and the OPC-NW address of the OPC area and has been recorded in the TDMA of the optical recording medium 100, in the cache memory 60a. That is, the system controller 60 acquires the information about the start address and the OPC-NW address of the OPC area stored in the cache memory 60a and performs the above-mentioned determination.

In a case where it is determined in Step S302 that the OPC area #8 has not been used, the system controller 60 proceeds to Step S303 and determines whether the OPC area #3 is available. In other words, the system controller 60 determines whether there is a space, which has a size equal to or greater than an area size scheduled to be used in the OPC process, in the OPC area #3. In this example, the system controller 60 determines whether the current OPC area is available, on the basis of information about the start address, length, and OPC-NW address of the current OPC area. Specifically, whether the size of an unused area of the OPC area which is calculated on the basis of the information is equal to or greater than the area size scheduled to be used in the OPC process is performed in order to determine whether the OPC area is available.

In a case where it is determined in Step S303 that the OPC area #3 is available, the system controller 60 selects the OPC area 3 as the OPC area to be used in Step S304 and proceeds to Step S315. In Step S315, the system controller 60 performs the OPC process in the selected area and ends the L0 correspondence process in Step S203.

Note that, in the OPC process, the system controller 60 directs the optical pickup 51 to access the selected OPC area and supplies a signal as an OPC test pattern to the laser driver 63 such that test recording is performed for the OPC area. Then, the system controller 60 reproduces the recorded OPC area, obtains the evaluation value of a reproduction information signal, and determines optimum recording laser power. Then, the system controller 60 sets laser power to the optimum power.

The OPC area #3 in the recording layer L0 is used by the flow of Step S302 to S304→S315 in a case where the OPC area #8 that is provided on the front side in the layer direction and overlaps the OPC area #3 has not been used.

Then, in a case where it is determined in Step S302 that the OPC area #8 has been used and in a case where it is determined in Step S303 that the OPC area #3 is not available, the system controller 60 proceeds to Step S305 and determines whether the OPC area #7 has not been used.

When the OPC area #7 has not been used, the system controller 60 proceeds to Step S306 and determines whether the OPC area #2 is available. When the OPC area #2 is available, the system controller 60 proceeds to Step S307 and selects the OPC area #2 as the OPC area to be used. Then, the system controller 60 proceeds to Step S315 and performs the OPC process in the selected area. Then, the system controller 60 ends the L0 correspondence process in Step S203.

In this way, the OPC area #2 in the recording layer L0 is used in a case where the OPC area #7 that is provided on the front side in the layer direction and overlaps the OPC area #2 has not been used.

In a case where it is determined in Step S305 that the OPC area #7 has been used and in a case where it is determined in Step S306 that the OPC area #2 is not available, the system controller 60 proceeds to Step S308 and determines whether the OPC area #1 is available. When the OPC area #1 is available, the system controller 60 proceeds to Step S309 and selects the OPC area #1 as the OPC area to be used. Then, the system controller 60 proceeds to Step S315 and performs the OPC process in the selected area. Then, the system controller 60 ends the L0 correspondence process in Step S203.

In contrast, in a case where it is determined in Step S308 that the OPC area #1 is not available, the system controller 60 proceeds to Step S310 illustrated in FIG. 10.

In Step S310 illustrated in FIG. 10, the system controller 60 determines whether the OPC areas #13 and #14 set in the OSA of the data zone have not been used. When the OPC areas #13 and #14 have not been used, the system controller 60 proceeds to Step S311 and determines whether the OPC area #11 in the recording layer L0 is available. When the OPC area #11 is available, the system controller 60 proceeds to Step S312 and selects the OPC area #11 as the OPC area to be used. Then, the system controller 60 proceeds to Step S315 described in FIG. 9, performs the OPC process in the selected area, and ends the L0 correspondence process in Step S203.

In this way, the OPC area #11 in the recording layer L0 is used in a case where the OPC areas #13 and #14 that are in the recording layer provided on the front side in the layer direction and overlap the OPC area #11 have not been used.

In a case where it is determined in Step S310 that the OPC areas #13 and #14 have been used and in a case where it is determined in Step S311 that the OPC area #11 is not available, the system controller 60 proceeds to Step S313 and determines whether the OPC area #10 is available. When the OPC area #10 is available, the system controller 60 proceeds to Step S314 and selects the OPC area #10 as the OPC area to be used. Then, the system controller 60 proceeds to Step S315 illustrated in FIG. 9, performs the OPC process in the selected area, and ends the L0 correspondence process in Step S203.

Furthermore, in a case where it is determined in Step S313 that the OPC area #10 is not available, that is, in a case where it is determined that all of the OPC areas set in the data zone (OSA) of the current layer are not available, the system controller 60 proceeds to Step S316 and performs a process of adding an OPC area to the user data area. Then, the system controller 60 ends the L0 correspondence process in Step S203.

Note that the process of adding an OPC area to the user data area will be described below.

Here, the process corresponding to the optical recording medium 100 to which the first file system has been applied has been described as the L0 correspondence process in Step S203. However, among the above-mentioned processes, the processes except the process in Steps S302 to S304 illustrated in FIG. 9 (that is, the process related to the OPC area #3) may be performed for the optical recording medium 100 to which the first file system has been applied.

When the L0 correspondence process in Step S203 is performed, the system controller 60 determines the type of file system applied to the optical recording medium 100 and performs a corresponding one of the processes illustrated in FIGS. 9 and 10 and the processes except the process in Steps S302 to S304 among the processes illustrated in FIGS. 9 and 10, on the basis of the determination result, which is not illustrated in the drawings.

Next, the L1 correspondence process in Step S204 will be described with reference to FIG. 11.

Figure 11:
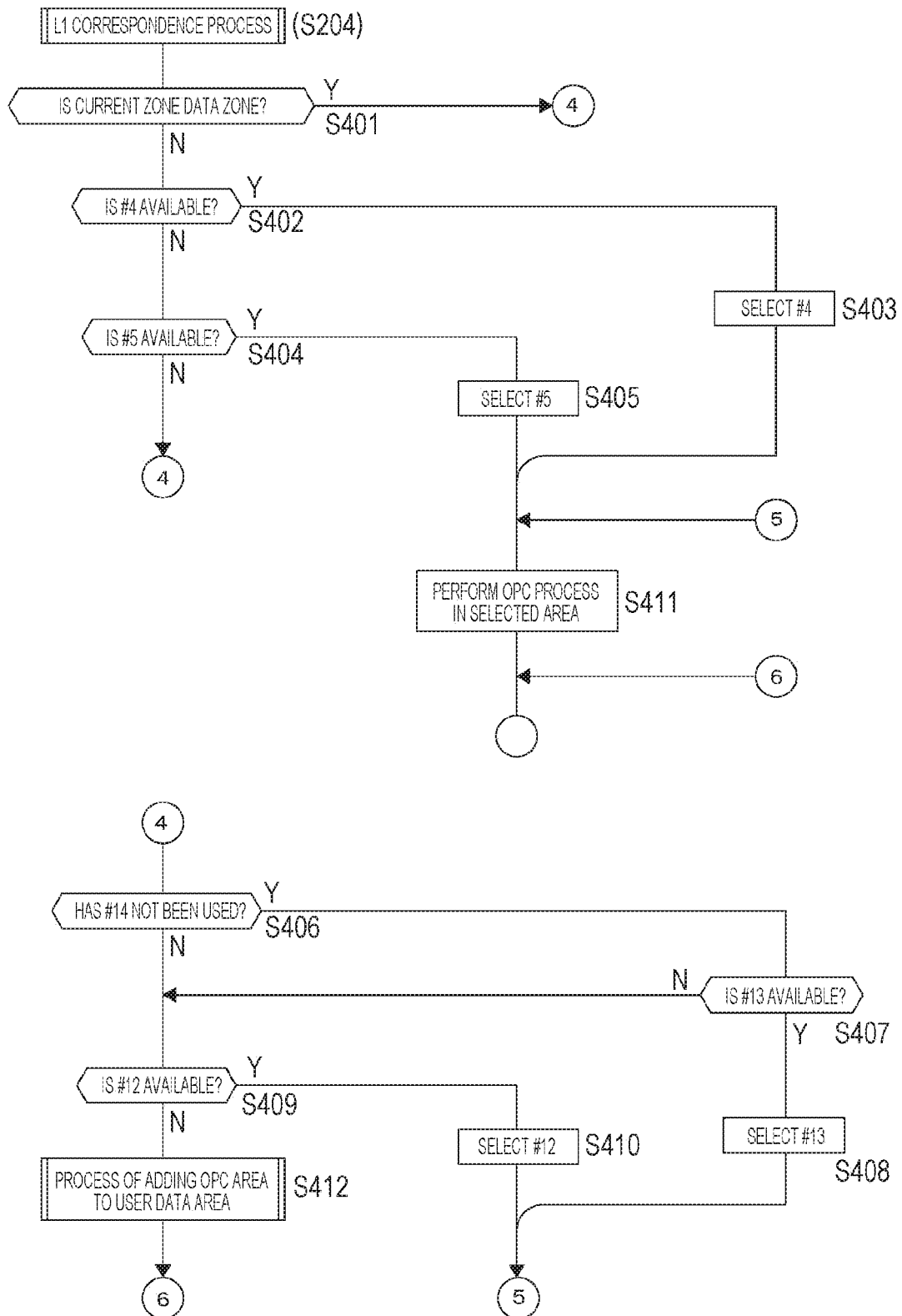
FIG. 11 is a flowchart illustrating an L1 correspondence process.

In Step S401 of FIG. 11, the system controller 60 determines whether the current zone is the data zone. When the current zone is data zone, the system controller 60 proceeds to Step S406 which will be described below.

When the current zone is not the data zone, the system controller 60 proceeds to Step S402 and determines whether the OPC area #4 is available. When the OPC area #4 is available, the system controller 60 selects the OPC area if #4 as the OPC area to be used in Step S403. Then, the system controller 60 proceeds to Step S411, performs the OPC process in the selected area, and ends the L1 correspondence process in Step S204.

Furthermore, in a case where it is determined in Step S402 that the OPC area if #4 is not available, the system controller 60 proceeds to Step S404 and determines whether the OPC area #5 is available. When the OPC area if #5 is available, the system controller 60 proceeds to Step S405 and selects the OPC area #5 as the OPC area to be used. Then, the system controller 60 proceeds to Step S411, performs the OPC process in the selected area, and ends the L1 correspondence process in Step S204.

In a case where it is determined in Step S404 that the OPC area #5 is not available, the system controller 60 proceeds to Step S406.

In Step S406, the system controller 60 determines whether the OPC area #14 set in the OSA of the data zone has not been used. When the OPC area #14 has not been used, the system controller 60 proceeds to Step S407 and determines whether the OPC area #13 in the recording layer L1 is available. When the OPC area #13 is available, the system controller 60 proceeds to Step S408 and selects the OPC area #13 as the OPC area to be used. Then, the system controller 60 proceeds to Step S411, performs the OPC process in the selected area, and ends the L1 correspondence process in Step S204.

In this way, the OPC area #13 in the recording layer L1 is used in a case where the OPC area #14 that is provided on the front side in the layer direction and overlaps the OPC area #13 has not been used.

In contrast, in a case where it is determined in Step S406 that the OPC area #14 has been used, the system controller 60 proceeds to Step S409 and determines whether the OPC area #12 is available. When the OPC area #12 is available, the system controller 60 proceeds to Step S410 and selects the OPC area #12 as the OPC area to be used. Then, the system controller 60 proceeds to Step S411, performs the OPC process in the selected area, and ends the L1 correspondence process in Step S204.

Furthermore, in a case where it is determined in Step S409 that the OPC area #12 is not available, that is, in a case where it is determined that all of the OPC areas set in the data zone (OSA) of the current layer are not available, the system controller 60 proceeds to Step S412, performs the process of adding an OPC area to the user data area, and ends the L1 correspondence process in Step S204.

The L2 correspondence process in Step S205 will be described with reference to FIG. 12.

Figure 12:
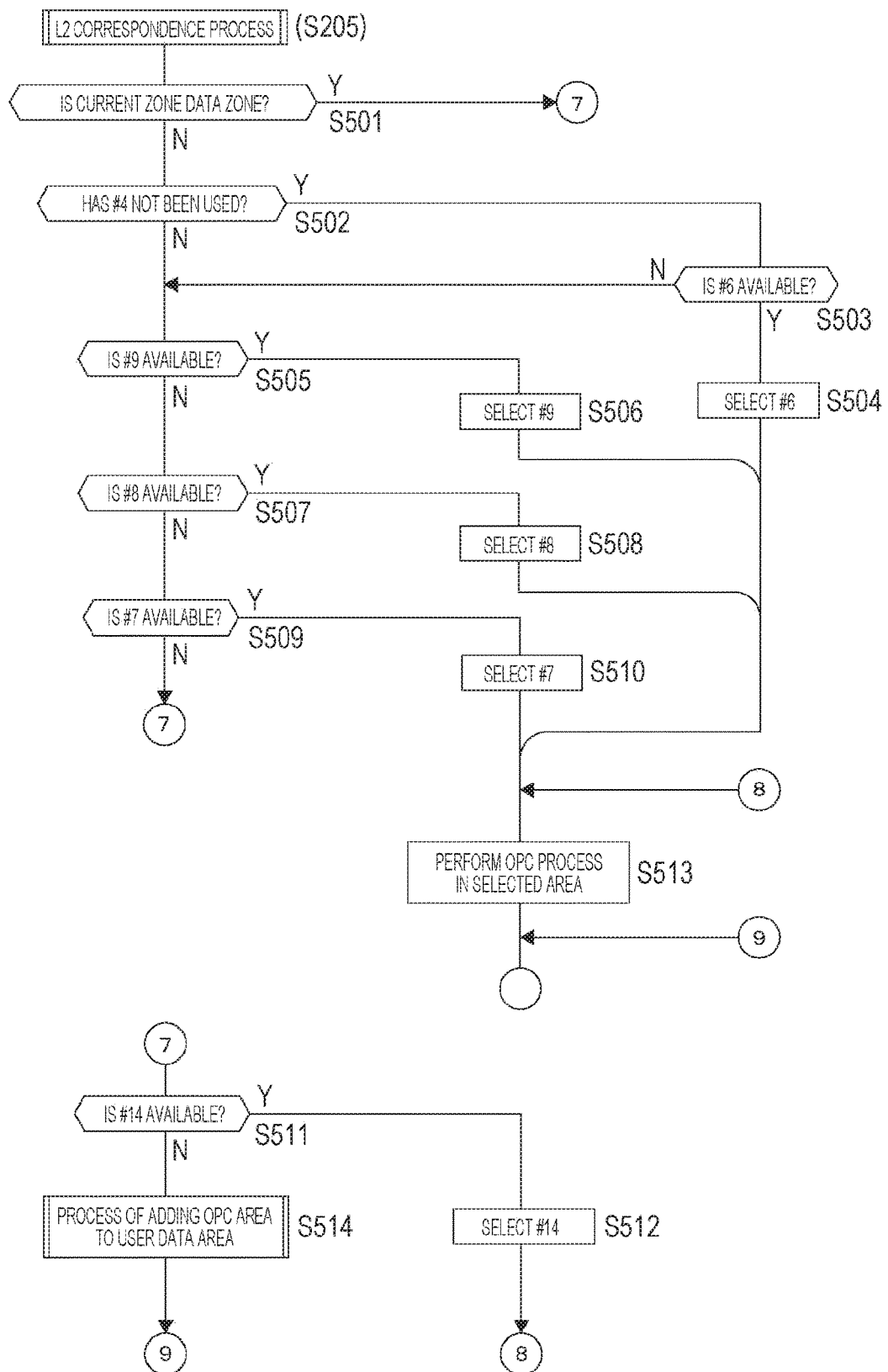
FIG. 12 is a flowchart illustrating an L2 correspondence process.

In Step S501 of FIG. 12, the system controller 60 determines whether the current zone is the data zone. When the current zone is the data zone, the system controller 60 proceeds to Step S511 which will be described below.

When the current zone is not the data zone, the system controller 60 proceeds to Step S502 and determines whether the OPC area #4 has been used. That is, the system controller 60 determines whether the current OPC area is regarded as having been used. For example, the system controller 60 determines whether there is a space with a size that is equal to or greater than an area size scheduled to be used in the OPC process.

When the OPC area #4 has been used, the system controller 60 proceeds to Step S503 and determines whether the OPC area #6 is available. When the OPC area #6 is available, the system controller 60 proceeds to Step S504 and selects the OPC area #6 as the OPC area to be used. Then, the system controller 60 proceeds to Step S513, performs the OPC process in the selected area, and ends the L2 correspondence process in Step S205.

In this way, the OPC area #6 in the recording layer L2 is used in a case where the OPC area #4 that is provided on the rear side and overlaps the OPC area #6 has been used.

In contrast, in a case where it is determined in Step S502 that the OPC area #4 has not been used, the system controller 60 proceeds to Step #505 and determines whether the OPC area #9 is available. When the OPC area #9 is available, the system controller 60 proceeds to Step #506 and selects the OPC area #9 as the OPC area to be used. Then, the system controller 60 proceeds to Step S513, performs the OPC process in the selected area, and ends the L2 correspondence process in Step S205.

Furthermore, in a case where it is determined in Step S505 that the OPC area if #9 is not available, the system controller 60 proceeds to Step S507 and determines whether the OPC area #8 is available. When the OPC area #8 is available, the system controller 60 proceeds to Step S508 and selects the OPC area #8 as the OPC area to be used. Then, the system controller 60 proceeds to Step S513, performs the OPC process in the selected area, and ends the L2 correspondence process in Step S205.

In addition, in a case where it is determined in Step S507 that the OPC area #8 is not available, the system controller 60 proceeds to Step S509 and determines whether the OPC area #7 is available. When the OPC area #7 is available, the system controller 60 proceeds to Step S510 and selects the OPC area #7 as the OPC area to be used. Then, the system controller 60 proceeds to Step S513, performs the OPC process in the selected area, and ends the L2 correspondence process in Step S205.

In a case where it is determined in Step S509 that the OPC area #7 is not available, the system controller 60 proceeds to Step S511.

In Step S511, the system controller 60 determines whether the OPC area #14 set in the OSA of the data zone is available. When the OPC area #14 is available, the system controller 60 proceeds to Step S512 and selects the OPC area #14 as the OPC area to be used. Then, the system controller 60 proceeds to Step S513, performs the OPC process in the selected area, and ends the L2 correspondence process in Step S205.

In a case where it is determined in Step S511 that the OPC area #14 is not available, that is, in a case where it is determined that all of the OPC areas set in the data zone (OSA) of the current layer are not available, the system controller 60 proceeds to Step S514 and performs a process of adding an OPC area to the user data area. Then, the system controller 60 ends the L2 correspondence process in Step S205.

The process (S316, S412, and S514) of adding an OPC area to the user data area will be described with reference to FIG. 13.

Figure 13:
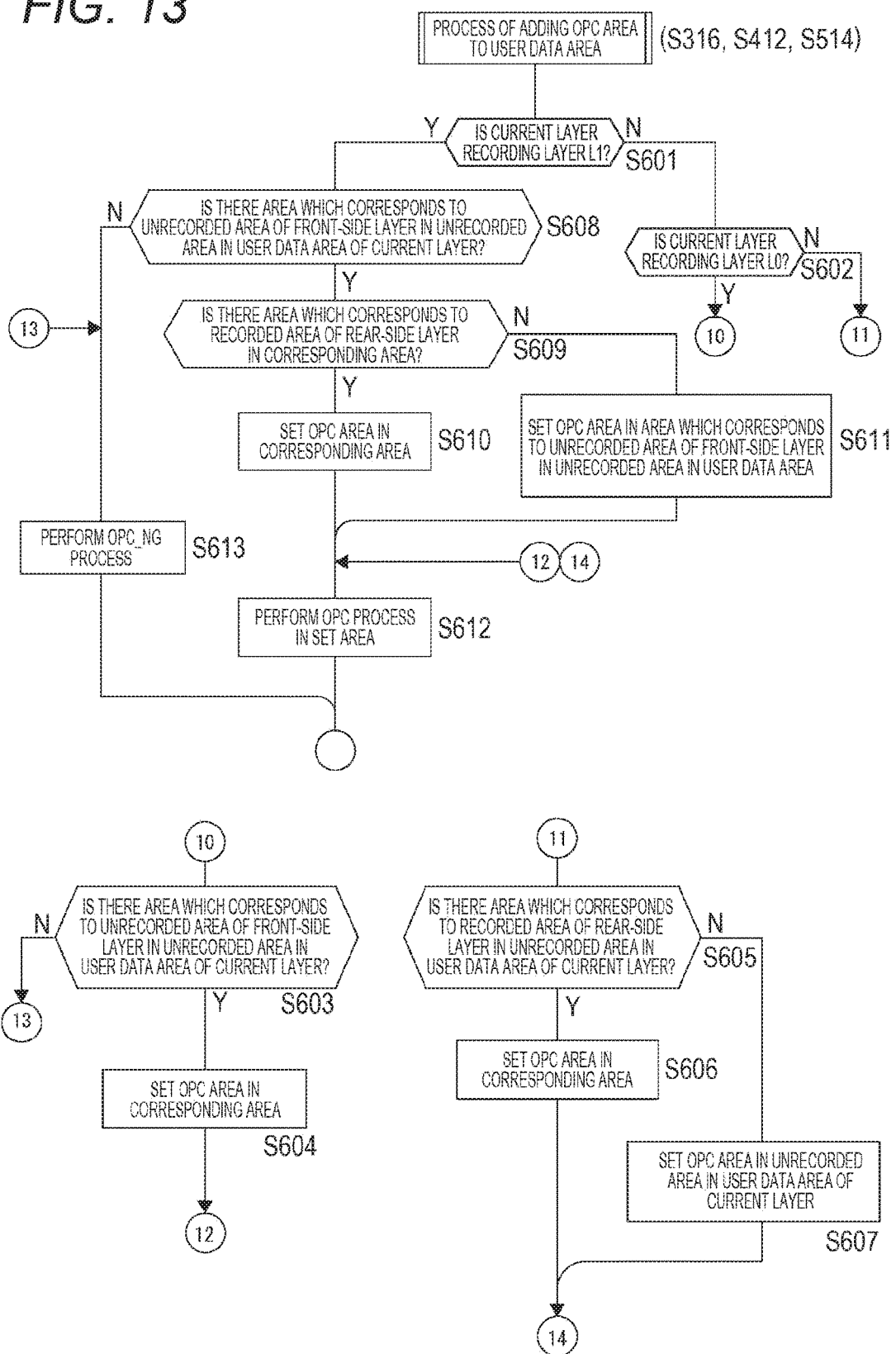
FIG. 13 is a flowchart illustrating a process of adding an OPC area to a user data area.

In Step S601 of FIG. 13, the system controller 60 determines whether the current layer is the recording layer L1. When the current layer is not the recording layer L1, the system controller 60 proceeds to Step S602 and determines whether the current layer is the recording layer L0.

When the current layer is the recording layer L0, the system controller 60 proceeds to Step S603 and determines whether there is an area, which corresponds to the unrecorded areas of the front-side recording layers L (that is, the recording layer L1 and the recording layer L2), in the unrecorded area in the user data area of the current layer (recording layer L0).

When there is an area, which corresponds to the unrecorded areas of the front-side recording layers L, in the unrecorded area in the user data area of the recording layer L0, the system controller 60 proceeds to Step S604 and sets the OPC area in the corresponding area. Then, the system controller 60 proceeds to Step S612 and performs the OPC process in the set area. Then, the system controller 60 ends the process illustrated in FIG. 13.

In contrast, in a case where it is determined in Step S603 that the corresponding area is absent, the system controller 60 proceeds to Step S613 and performs an OPC_NG process. Then, the system controller 60 ends the process illustrated in FIG. 13. As the OPC_NG process, a process is performed which prohibits the recording of data to at least the current layer in correspondence with the impossibility of adding the OPC area.

Furthermore, in a case where it is determined in Step S602 that the current layer is not the recording layer L0 (that is, the current layer is the recording layer L2), the system controller 60 proceeds to Step S605 and determines whether there is an area, which corresponds to the recorded areas of the rear-side recording layers L, in the unrecorded area in the user data area of the current layer (recording layer L2). Specifically, for example, the system controller 60 determines whether there is an area which corresponds to the recorded areas of both of the rear-side recording layers L1 and L0.

When there is an area, which corresponds to the recorded areas of the rear-side recording layers L, in the unrecorded area in the user data area of the recording layer L2, the system controller 60 proceeds to Step S606 and sets the OPC area in the corresponding area. Then, the system controller 60 proceeds to Step S612 and performs the OPC process in the set area. Then, the system controller 60 ends the process illustrated in FIG. 13.

In contrast, when there is no area, which corresponds to the recorded areas of the rear-side recording layers L, in the unrecorded area in the user data area of the recording layer L2, the system controller 60 proceeds to Step S607 and sets the OPC area in the unrecorded area in the user data area of the current layer (recording layer L2). Then, the system controller 60 proceeds to Step S612 and performs the OPC process in the set area. Then, the system controller 60 ends the process illustrated in FIG. 13.

Note that, for the additional setting of the OPC area in a case where the current layer is the recording layer L having a plurality of recording layers L on the rear side, such as the recording layer L2, when there is an area corresponding to the recorded area of at least one rear-side recording layer L, the OPC area may be set in the area. In addition, the OPC area may be preferentially additionally set in an area of the recording layer L having a large number of recording layers on the rear side.

Then, in a case where it is determined in Step S601 that the current layer is the recording layer L1, the system controller 60 proceeds to Step S608 and determines whether there is an area, which corresponds to the unrecorded area of the front-side recording layer L (that is, the recording layer L2), in the unrecorded area in the user data area of the current layer.

In a case where it is determined in Step S608 that there is no area, which corresponds to the unrecorded area of the front-side recording layer L, in the unrecorded area in the user data area of the recording layer L1, the system controller 60 performs an OPC_NG process in Step S613 and ends the process illustrated in FIG. 13.

In contrast, in a case where it is determined in Step S608 that there is an area, which corresponds to the unrecorded area of the front-side recording layer L, in the unrecorded area in the user data area of the recording layer L1, the system controller 60 proceeds to Step S609 and determines whether there is an area, which corresponds to the recorded area of the rear-side recording layer L (recording layer L0), in the corresponding area.

In a case where it is determined in Step S609 that the corresponding area (that is, an area, which corresponds to the unrecorded area of the front-side recording layer L2 and the recorded area of the rear-side recording layer L0, in the unrecorded area in the user data area of the recording layer L1) is present, the system controller 60 proceeds to Step S610 and sets the OPC area in the corresponding area. Then, the system controller 60 proceeds to Step S612 and performs the OPC process in the set area. Then, the system controller 60 ends the process illustrated in FIG. 13.

In contrast, in a case where it is determined in Step S609 that the corresponding area is absent, the system controller 60 proceeds to Step S611 and sets the OPC area in an area, which corresponds to the unrecorded area of the front-side recording layers L2, in the unrecorded area in the user data area of the current layer (recording layer L1). Then, the system controller 60 proceeds to Step S612 and performs the OPC process in the set area. Then, the system controller 60 ends the process illustrated in FIG. 13.

Note that, in a case where there is no unrecorded area, to which the OPC area can be added, in the area (in this example, the user data area) in which the OPC area is to be additionally set when the OPC area is additionally set, the additional setting of the OPC area in the current layer is not performed. In this case, since it is impossible to additionally set the OPC area, a process of prohibiting the recording of data on at least the current layer is performed.

Furthermore, as can be understood from the above description, even in a case where the OPC area is additionally set, the system controller 60 performs a process of recording information indicating the position of the set OPC area (including information about the OPC-NW address in a case where the OPC area has been used) on the optical recording medium 100.

5. Summary of Embodiment

As described above, the recording device (drive device 50) according to the embodiment includes a recording unit (for example, the optical pickup 51, the reader/writer circuit 55, the modulation/demodulation circuit 56, and the ECC encoder/decoder 57) that irradiates a recording layer of an optical recording medium (optical recording medium 100) having a plurality of recording layers with laser light to record information and a control unit (system controller 60) that sets a test area (OPC area), in which test writing for laser power control is performed, in each recording layer and directs the recording unit to record information indicating the position of the set test area on the optical recording medium.

Therefore, it is possible to arrange an arbitrary number of test areas at any positions while guaranteeing that other devices (devices other than the device that has set the test area) can recognize the position of the test area. That is, for an optical recording medium in which the amounts of test areas used in each recording layer are likely to be different from each other, it is possible to adaptively set the test area in each case.

Therefore, it is possible to reduce the possibility that data will not be recorded due to a shortage of test areas.

Furthermore, in the recording device according to the embodiment, the control unit sets the test area according to the type of file system applied to the optical recording medium.

Therefore, it is possible to adaptively set the test area according to the file system in correspondence with a case where the amount of test area used in each recording layer varies depending on the type of file system.

As a result, it is possible to reduce the possibility that data will not be recorded due to a shortage of test areas.

In addition, in the recording device according to the embodiment, the control unit determines whether to use a use candidate area which is a test area candidate proposed to be used among the set test areas, on the basis of the usage of a rear-side test area that overlaps the use candidate area on the side opposite to the laser incident surface (100a) in the layer direction of the optical recording medium.

With this structure, it is possible to check that the rear-side test area has been used and then to use the front-side test area.

Therefore, it is possible to reliably use the rear-side test area. As a result, it is possible to prevent the waste of the test area (the waste of the test area caused by the unavailability of the rear-side test area due to a change in transmittance which is caused by the use of the front-side test area).

Furthermore, in the recording device according to the embodiment, the control unit determines whether to use a use candidate area which is a test area proposed to be used among the set test areas, on the basis of the usage of a front-side test area that overlaps the use candidate area on the laser incident surface side in the layer direction of the optical recording medium.

With this structure, it is possible to use the rear-side test area after checking that a change in transmittance has not occurred in the front-side test area.

Therefore, it is possible to appropriately adjust laser power.

In addition, in the recording device according to the embodiment, the control unit sets the test area in the inner zone that is closer to the inner circumferential side than the data zone in which user data is recorded and the data zone.

Therefore, the number of test areas can be greater than that in a case where the test area is set only in the inner zone.

Furthermore, it is possible to respond to a case where it is preferable to separately adjust laser power in the inner zone and the data zone, for example, a case where recording is performed in the data zone at a higher speed and a higher density than that in the inner zone.

Furthermore, in the recording device according to the embodiment, the control unit sets a new test area other than the test area, of which the positional information has been recorded on the optical recording medium, in the data zone and directs the recording unit to record information indicating the position of the set test area on the optical recording medium.

Therefore, it is possible to add a test area to the area in which user data is recorded, if necessary.

As a result, it is possible to further reduce the possibility that data will not be recorded on the optical recording medium due to a shortage of test areas.

In addition, in the recording device according to the embodiment, in a case where the test area is set in the data zone, the control unit sets the test area in an area which corresponds to an unrecorded area of the front-side recording layer which is closer to the laser incident surface than the recording layer in which the test area is to be set.

Therefore, it is possible to add a test area to an area behind the area in which there is no change in transmittance.

As a result, it is possible to reduce the possibility that the adjustment of laser power will fail in the set test area.

Furthermore, in the recording device according to the embodiment, in a case where the test area is set in the data zone, the control unit sets the test area in an area which corresponds to a recorded area of the rear-side recording layer that is closer to the surface opposite to the laser incident surface than the recording layer in which the test area is to be set.

In a case where laser power is adjusted in the set test area on condition that data has been recorded in the corresponding area of the rear-side recording layer, it is possible to prevent data from being not recorded in a state in which there is an unrecorded area in the rear-side recording layer.

Therefore, it is possible to prevent the waste of a recording space.

In addition, the optical recording medium (optical recording medium 100) according to the embodiment includes a plurality of recording layers. The test area in which test writing for laser power control is performed is set in each recording layer and information indicating the position of the set test area is recorded on the optical recording medium.

Therefore, it is possible to achieve an optical recording medium in which an arbitrary number of test areas can be arranged at any positions and it is guaranteed that the position of the test area can be recognized by other devices (devices other than the device that has set the test area).

Furthermore, the reproducing device (drive device 50) according to the embodiment includes a reproducing unit (for example, the optical pickup 51, the reader/writer circuit 55, the modulation/demodulation circuit 56, and the ECC encoder/decoder 57) that irradiates the optical recording medium (optical recording medium 100), which has a plurality of recording layers, in which the test area in which test writing for laser power control is performed is set in each recording layer, and on which information indicating the position of the set test area is recorded, with laser light to reproduce recorded information and a control unit (system controller 60) that directs the reproducing unit to reproduce the recorded information of the optical recording medium and acquires the information indicating the position of the test area.

With this structure, it is possible to ensure compatibility with the test area.

6. Modification Examples

The embodiment of the present technology has been described above. However, the present technology is not limited to the above-described embodiment and various modification examples may be considered in the scope and spirit of the present technology.

For example, in the above-described embodiment, it is assumed that data is recorded in the grooves of the optical recording medium 100. However, the present technology may be applied to a land-recording-type optical recording medium in which data is recorded in a land between the grooves. Alternatively, the present technology may be applied to a land/groove-recording-type optical recording medium in which data is recorded in a groove and a land.

Figure 14:
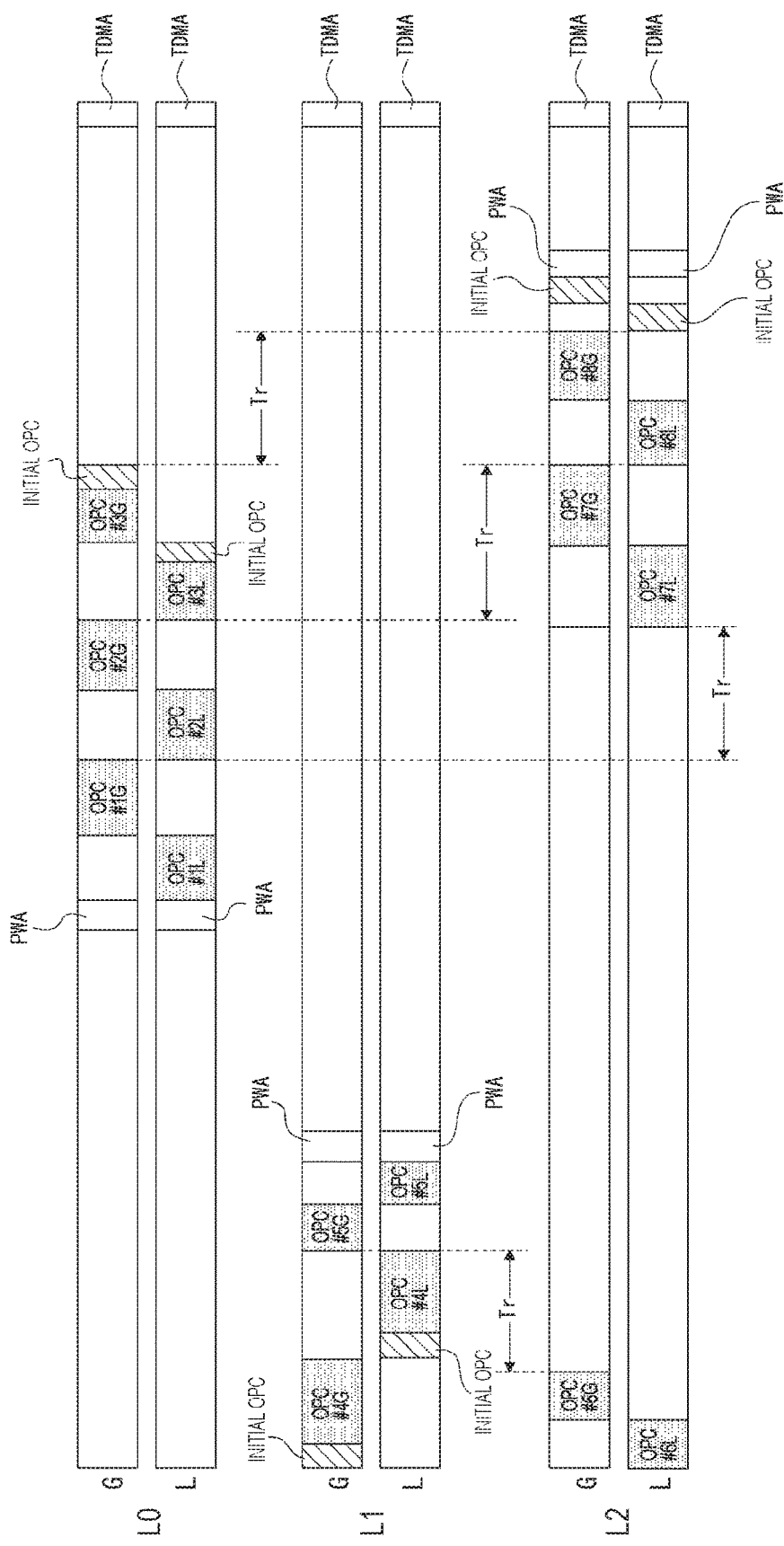
FIG. 14 is a diagram illustrating an example of the setting of the OPC areas corresponding to a case where a land/groove recording method is used.

FIG. 14 illustrates an example of the setting of an OPC area in a case where the land/groove recording type is used.

In the example of the setting illustrated in FIG. 14, a groove-side OPC area (having "G" at the end) and a land-side OPC area (having "L" at the end) are set in the area in which each OPC area having # added thereto is set in the example of the setting illustrated in FIG. 5A.

In the land/groove recording type, a groove and a land which are adjacent to each other are likely to be affected by laser power adjustment (test writing). Therefore, in each of OPC areas #1 to #8, the groove-side OPC area and the land-side OPC area are arranged so as not to be adjacent to each other, as illustrated in FIG. 14. In this case, in the initial OPC area, similarly, the groove-side OPC area and the land-side OPC area are arranged so as not to be adjacent to each other, as illustrated in FIG. 14.

Note that FIG. 14 illustrates only the example of the setting of the OPC area in the inner zone. However, for the setting of the OPC area in the data zone, similarly, the OPC areas may be set on the groove side and the land side such that the groove-side OPC area and the land-side OPC area are not adjacent to each other.

Here, in a case where the land/groove recording type is used, there may be a difference between the amount of OPC area used in the groove and the amount of OPC area used in the land. For example, in some cases, both laser power adjustment and write strategy adjustment are performed in the groove and only laser power adjustment is performed in the land. According to the recording device of the embodiment which can set the OPC areas at any positions of an optical recording medium, the OPC areas can be to the grooves and the lands by distribution suitable for a case where there is a difference between the amounts of OPC areas used.

7. The Present Technology

The present technology may use the following configuration.

(1)

A recording device including:

a recording unit that irradiates a recording layer of an optical recording medium having a plurality of recording layers with laser light to record information; and a control unit that sets a test area, in which test writing for laser power control is performed, in each of the recording layers and directs the recording unit to record information indicating a position of the set test area on the optical recording medium.

(2)

The recording device according to (1), in which the control unit sets the test area according to a type of file system applied to the optical recording medium.

(3)

The recording device according to (1) or (2), in which the control unit determines whether to use a use candidate area, which is a test area candidate proposed to be used, among the set test areas, on the basis of the usage of a rear-side test area which is closer to a surface opposite to a laser incident surface in a layer direction of the optical recording medium than the use candidate area and overlaps the use candidate area.

(4)

The recording device according to any of (1) to (3), in which the control unit determines whether to use a use candidate area, which is a test area candidate proposed to be used, among the set test areas, on the basis of the usage of a front-side test area which is closer to a laser incident surface in a layer direction of the optical recording medium than the use candidate area and overlaps the use candidate area.

(5)

The recording device according to any of (1) to (4), in which the control unit sets the test area in an inner zone that is closer to an inner circumferential side than a data zone in which user data is recorded and the data zone.

(6)

The recording device according to (5), in which the control unit sets a new test area other than the test area, of which the positional information has been recorded on the optical recording medium, in the data zone and directs the recording unit to record information indicating the position of the set test area on the optical recording medium.

(7)

The recording device according to (6), in which, in a case where the test area is set in the data zone, the control unit sets the test area in an area which corresponds to an unrecorded area of a front-side recording layer that is closer to the laser incident surface than the recording layer in which the test area is to be set.

(8)

The recording device according to (6) or (7), in which, in a case where the test area is set in the data zone, the control unit sets the test area in an area which corresponds to a recorded area of a rear-side recording layer that is closer to a surface opposite to the laser incident surface than the recording layer in which the test area is to be set.

REFERENCE SIGNS LIST

50 Drive device
51 Optical pickup
55 Reader/writer circuit
56 Modulation/demodulation circuit
57 ECC encoder/decoder
60 System controller
100 Optical recording medium
100a Laser incident surface
L0, L1, L2 Recording layer

The invention claimed is:

1. A recording device, comprising:
a recording unit configured to irradiate a first recording layer, of a plurality of recording layers of an optical recording medium, with a laser light to record information; and
a control unit configured to:
set a first test area for each of the plurality of recording layers, wherein a test writing process for laser power control is executed in the set first test area, for each of the plurality of recording layers based on a type of file system applied to the optical recording medium, and
direct the recording unit to record information, wherein the recorded information indicates a position of the set first test area on the optical recording medium.

2. The recording device according to claim 1, wherein the control unit is further configured to:
set a plurality of test areas, and
determine a usable state of a use candidate area, wherein the use candidate area is a test area proposed by a candidate among the plurality of test areas, based on the usable state of a rear-side test area,
wherein the rear-side test area is closer to a surface opposite to a laser incident surface, in a layer direction of the optical recording medium, than the use candidate area, and
wherein the rear-side test area overlaps the use candidate area.

3. The recording device according to claim 1, wherein the control unit is further configured to:
set a plurality of test areas, and
determine a usable state of a use candidate area, wherein the use candidate area is a test area proposed by a candidate from the set plurality of test areas, based on the usable state of a front-side test area,
wherein the front-side test area is closer to a laser incident surface in a layer direction of the optical recording medium, than the use candidate area, and
wherein the front-side test area overlaps the use candidate area.

4. The recording device according to claim 1, wherein the control unit is further configured to:
set the first test area in an inner zone of each of the plurality of recording layers, wherein the inner zone is closer to an inner circumferential side of a first recording layer of the plurality of recording layers, than a data zone in which user data is recorded, and
set the data zone.

5. The recording device according to claim 4, wherein the control unit is further configured to:
set a second test area, wherein the set second test area is different from the set first test area,
wherein positional information of the set second test area has been recorded on the optical recording medium, in the data zone, and
direct the recording unit to record information, wherein the recorded information indicates the position of the set second test area on the optical recording medium.

6. The recording device according to claim 5, wherein the control unit is further configured to set the second test area in an area in the data zone,
wherein the area corresponds to an unrecorded area of a front-side recording layer of the plurality of recording layers, wherein the front-side recording layer is closer to a laser incident surface than the first recording layer, and wherein the first test area is set in the first recording layer.

7. The recording device according to claim 5, wherein the control unit is further configured to set the second test area in an area in the data zone, wherein the area corresponds to a recorded area of a rear-side recording layer of the plurality of recording layers, wherein the rear-side recording layer is closer to a surface opposite to a laser incident surface than the first recording layer, and wherein the first test area is set in the first recording layer.

8. A recording method, comprising:

setting a test area for each of a plurality of recording layers, wherein a test writing process for laser power control is executed in the set test area, for each of the plurality of recording layers of an optical recording medium based on a type of file system applied to the optical recording medium; and recording information, wherein the recorded information indicates a position of the set test area on the optical recording medium.

9. A reproducing device, comprising:

a reproducing unit configured to:
    irradiate an optical recording medium,
        wherein the optical recording medium includes a plurality of recording layers, and
        wherein in each of the plurality of recording layers a test area is set,
    wherein a test writing process for laser power control is performed in the set test area, based on a type of file system applied to the optical recording medium, and
    record information of a position of the set test area via laser light to reproduce recorded information; and a control unit configured to:
    direct the reproducing unit to reproduce the recorded information of the optical recording medium, and
    acquire the recorded information, that indicates the position of the test area.

10. A reproducing method, comprising:

reproducing recorded information of an optical recording medium,
    wherein the optical recording medium includes a plurality of recording layers, and
    wherein each of the plurality of recording layers includes a test area, in which a test writing process for laser power control is executed;

setting the test area in each of the plurality of recording layers based on a type of file system applied to the optical recording medium;

recording information, wherein the recorded information indicates a recorded position of the set test area; and acquiring the recorded information that indicates the recorded position of the set test area.

* * * * *